Figure 1:
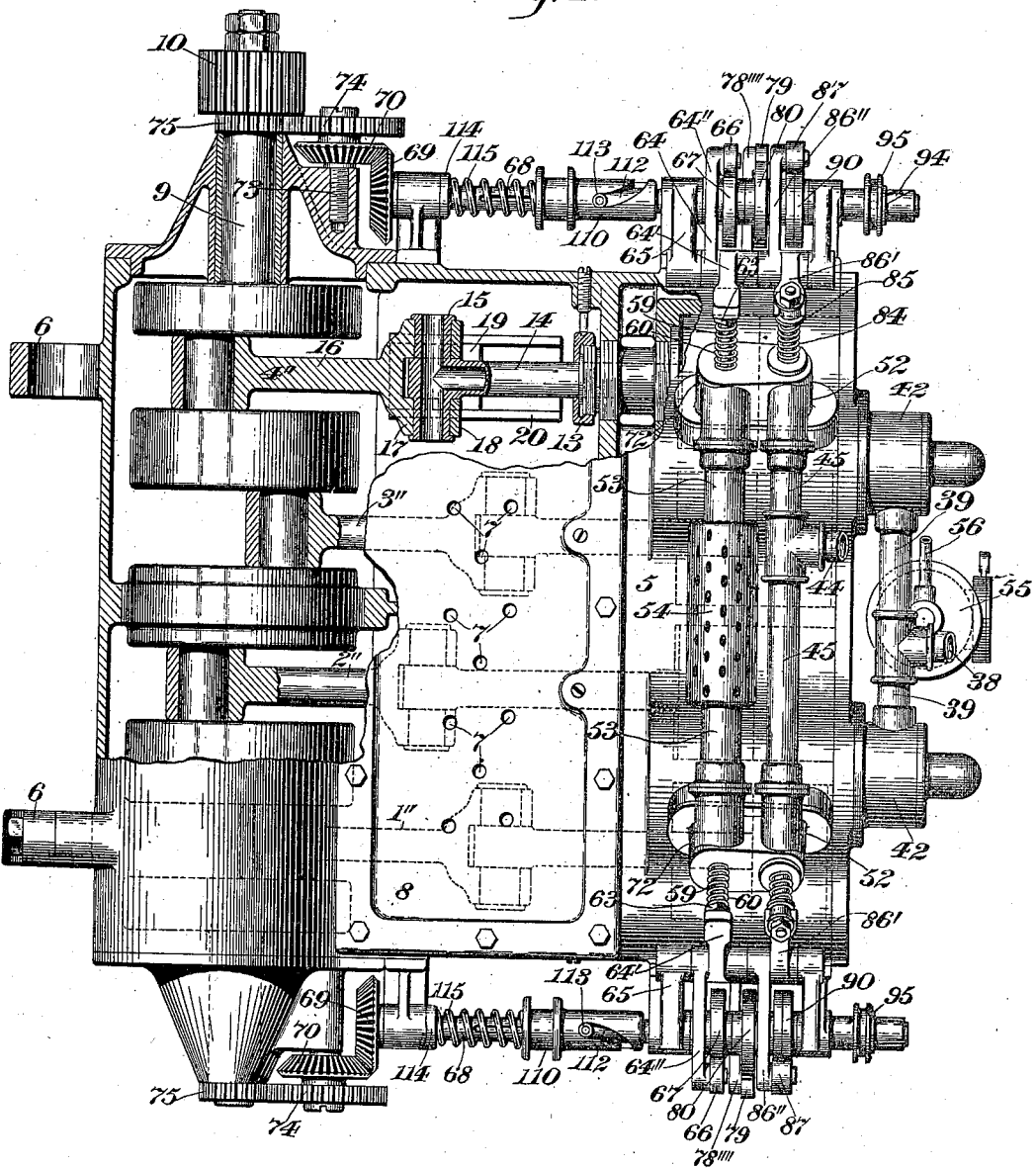

A. G. PACE.
GAS ENGINE.
APPLICATION FILED AUG. 14, 1899.

963,243.

Patented July 5, 1910.
10 SHEETS—SHEET 3.

Witnesses:

Inventor:
Augustus G. Pace.
By his Attorney,

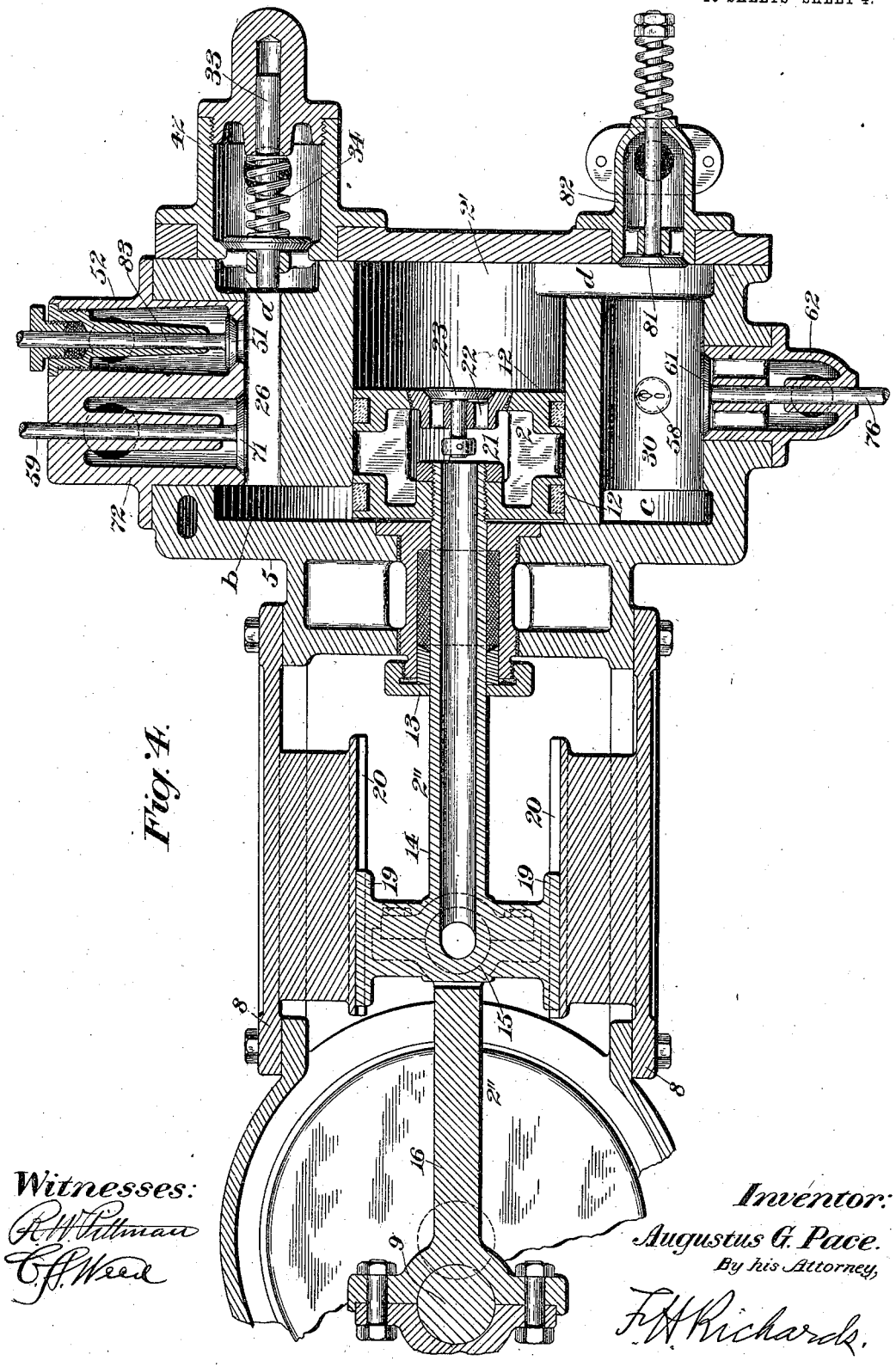

A. G. PACE.
GAS ENGINE.
APPLICATION FILED AUG. 14, 1899.

963,243.

Patented July 5, 1910.
10 SHEETS—SHEET 5.

Witnesses
R. H. Pittman
C. H. Weed

Inventor:
Augustus G. Pace
By his Attorney
F. H. Richards.

A. G. PACE.
GAS ENGINE.
APPLICATION FILED AUG. 14, 1899.
963,243.
Patented July 5, 1910.
10 SHEETS—SHEET 6.
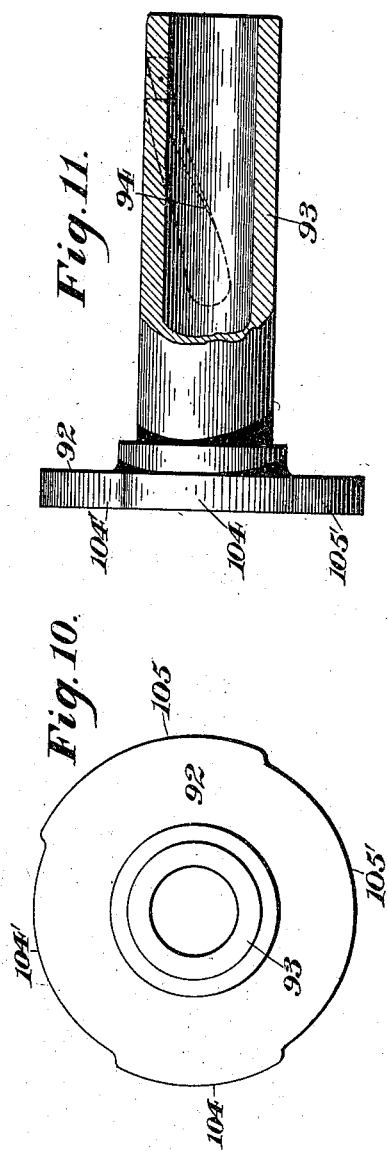
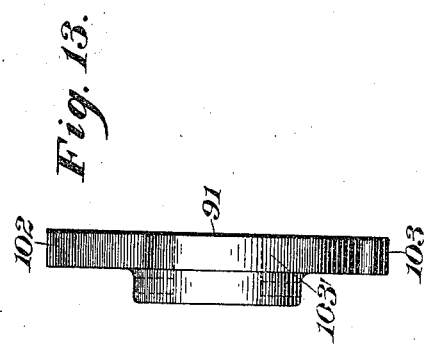
Witnesses.
Inventor.
Augustus G. Pace.
By his Attorney
F. H. Richards.

A. G. PACE.
GAS ENGINE.
APPLICATION FILED AUG. 14, 1899.

963,243.

Patented July 5, 1910.
10 SHEETS—SHEET 7.

Witnesses.

Inventor
Augustus G. Pace.
By his Attorney.

A. G. PACE.
GAS ENGINE.
APPLICATION FILED AUG. 14, 1899.

963,243.

Patented July 5, 1910.
10 SHEETS—SHEET 8.

Witnesses:

Inventor:
Augustus G. Pace.
By his Attorney,

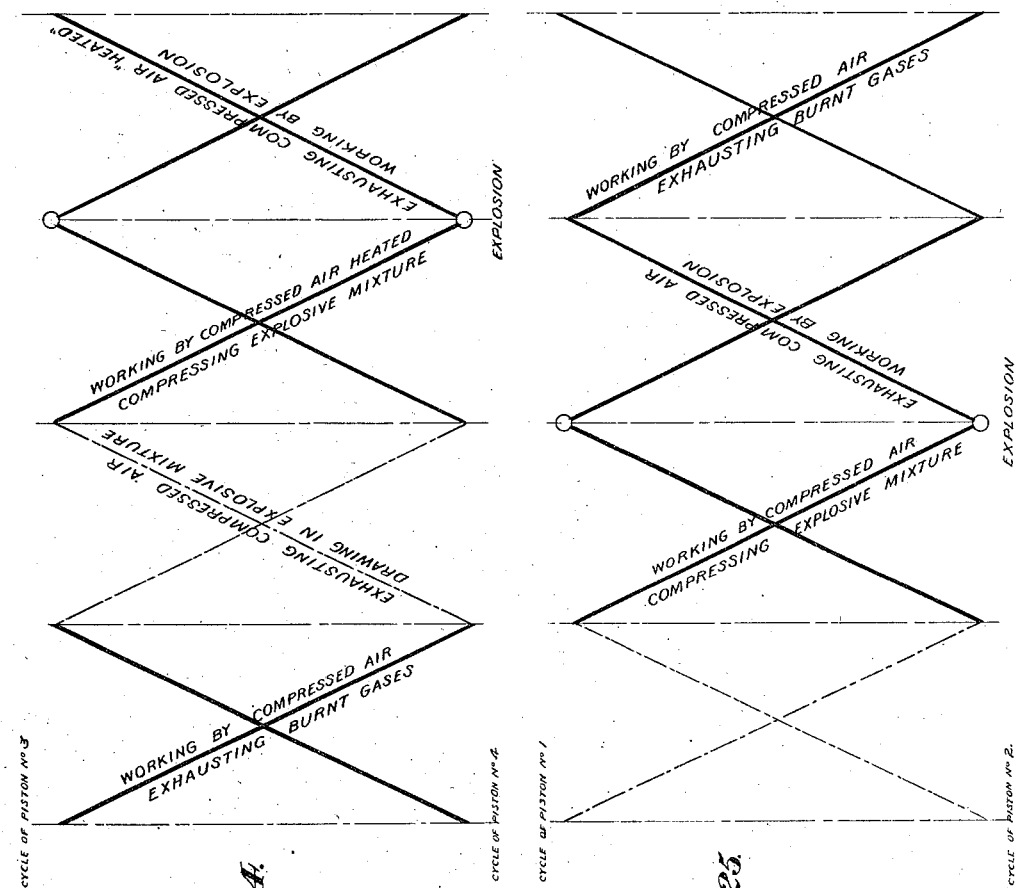

UNITED STATES PATENT OFFICE.

AUGUSTUS G. PACE, OF NEW YORK, N. Y.

GAS-ENGINE.

963,243. Specification of Letters Patent. Patented July 5, 1910.

Application filed August 14, 1899. Serial No. 727,176.

*To all whom it may concern:*

Be it known that I, AUGUSTUS G. PACE, a citizen of the United States, residing in New York, in the county of New York and State of New York, have invented certain new and useful Improvements in Gas-Engines, of which the following is a specification.

This invention relates to engines, and more particularly to that class thereof known as "gas-engines," the present improvement being especially designed for use as a propelling means for vehicles—especially vehicles of large size.

One of the primary objects of the invention is to provide a self-starting gas-engine, and for this purpose the engine is provided with means by which a fluid—such, for instance, as air—may be utilized, in a manner similar to the combustible material, for operating the pistons to start the engine.

A further object of the invention is to provide an improved gas-engine in which the pistons, during the ordinary running cycle, will be operated at one period by the action of an explosive material, and at another period by the action of an independent material—such, for instance, as air.

A further object of the invention is to provide an improved engine comprising a plurality of piston-cylinders, and an air-chamber communicating with the cylinders in such manner that the pressure of the air admitted thereto will be simultaneously exerted at one end of one cylinder and at the opposite end of another cylinder.

Another object of the invention is to provide an improved organization comprising one or more sets of piston-cylinders; a combustion-chamber communicating with each set of cylinders in such manner that the pressure of the explosive material will be simultaneously exerted at one end of one cylinder and at the opposite end of another cylinder; and an air-chamber, also communicating with each set of said cylinders in such manner that the pressure of air admitted thereto will be simultaneously exerted at one end of one cylinder and at the opposite end of another cylinder, combined with mechanism effective to control the admission and exhaust of air to and from said air-chamber and the admission of combustible material to the combustion-chamber and the exhaust of the products of combustion therefrom.

A further object of the invention is to provide an improved organization of mechanisms involving combustion-controlling mechanism and air-controlling mechanism, and in which organization atmospheric air is drawn into the apparatus and compressed and then expanded by the exhaust products of combustion, such expanded air then being utilized to operate the pistons, whereby by the use of such exhaust products of combustion the compressed air will be increased in volume and pressure, while at the same time such exhaust products are utilized, thus effecting a material economy in the working of the engine.

Another object of the invention is to so organize the mechanisms of an engine of this character than when the compressed and heated air is admitted to the piston-cylinders from the air-chamber such cylinders will be in a highly-heated condition, due to the explosion which has just previously occurred, so that the compressed and heated air will again be increased in efficiency by such heated cylinders.

As a preface to a further description of this improved engine I desire to state that the same is shown herein as a horizontal engine, whereby it can be more effectively secured in position in connection with the running-gear of a vehicle, although it will be understood that it may be used as an upright-engine, if desired, the present engine being in some respects an improvement over the engine shown and described in my contemporaneously-pending application, Serial No. 681,506, filed May 23, 1898, which has eventuated in reissue Patent No. 11,775, dated September 26, 1899.

Figure 2:
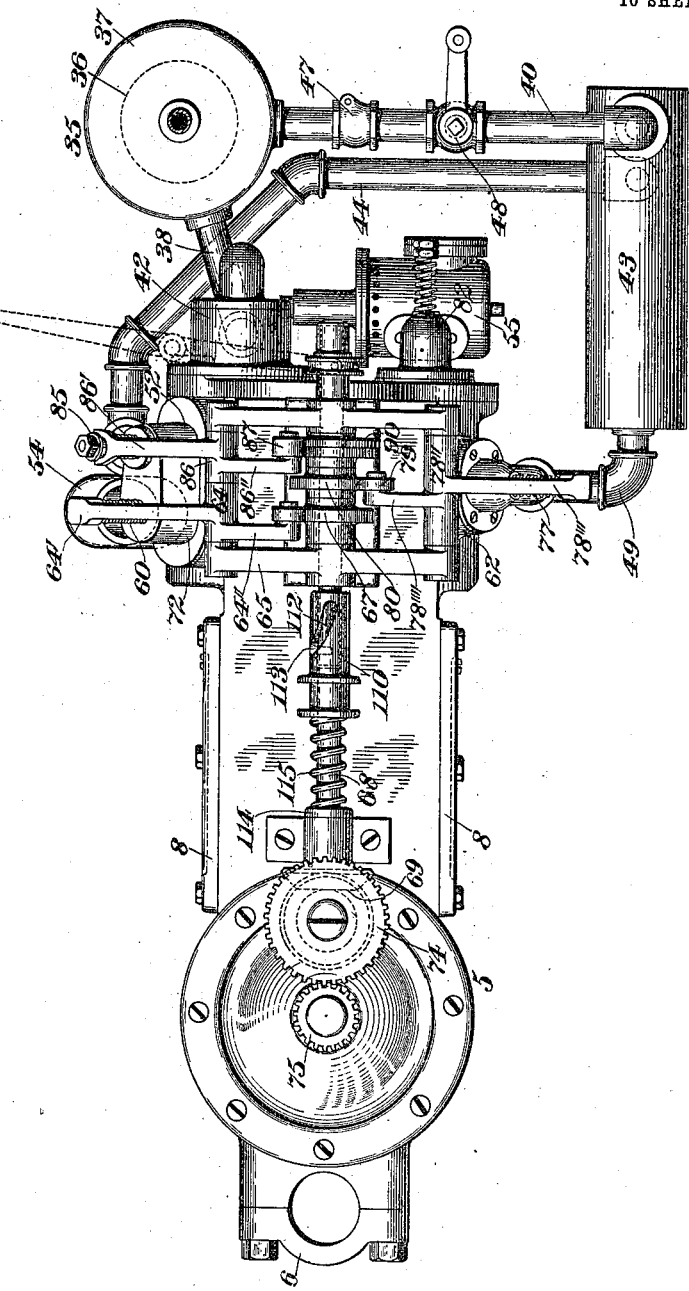
Figure 3:
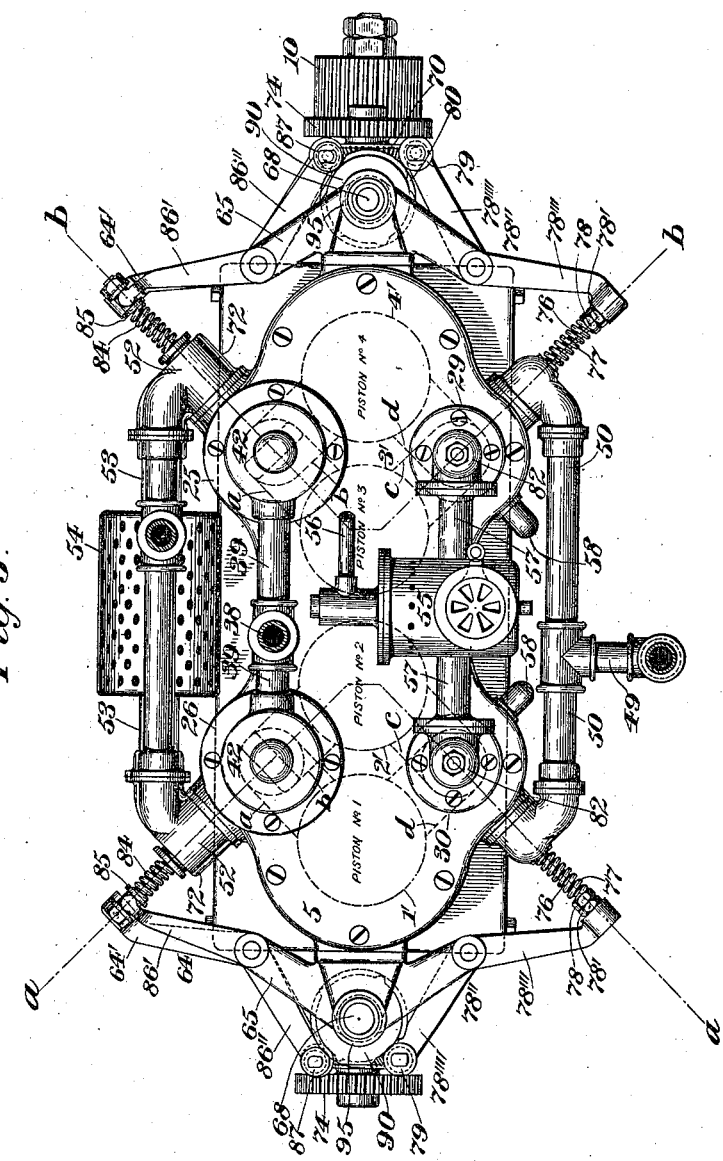
Figure 9:
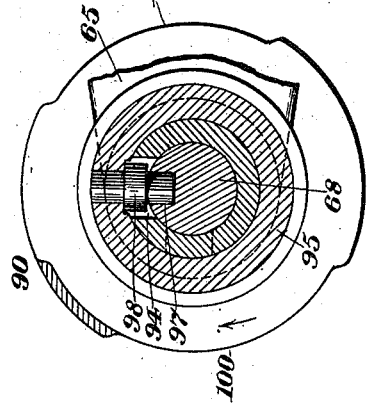
Figure 7:
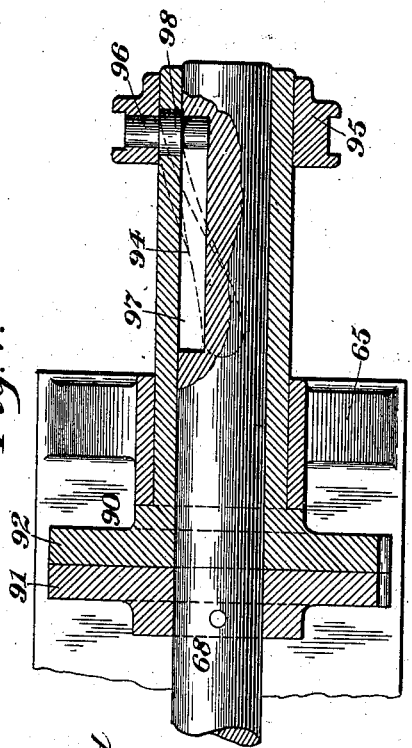
Figure 8:
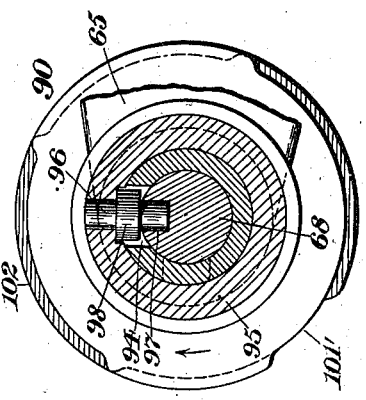
Figure 5:
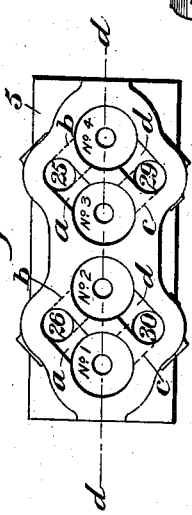
Figure 6:
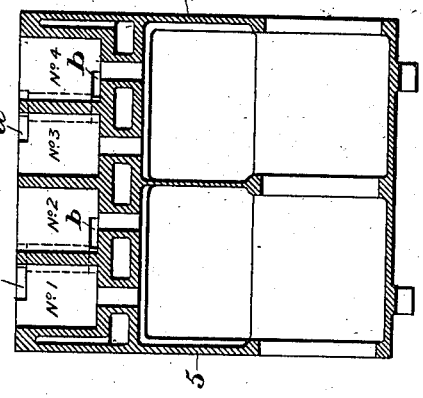
Figure 18:
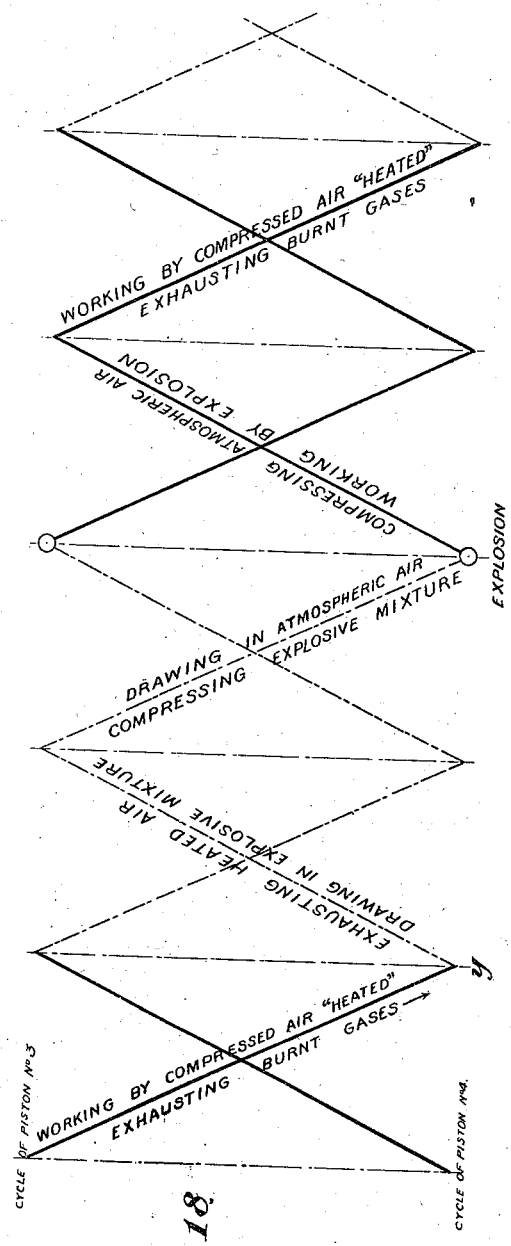
Figure 19:
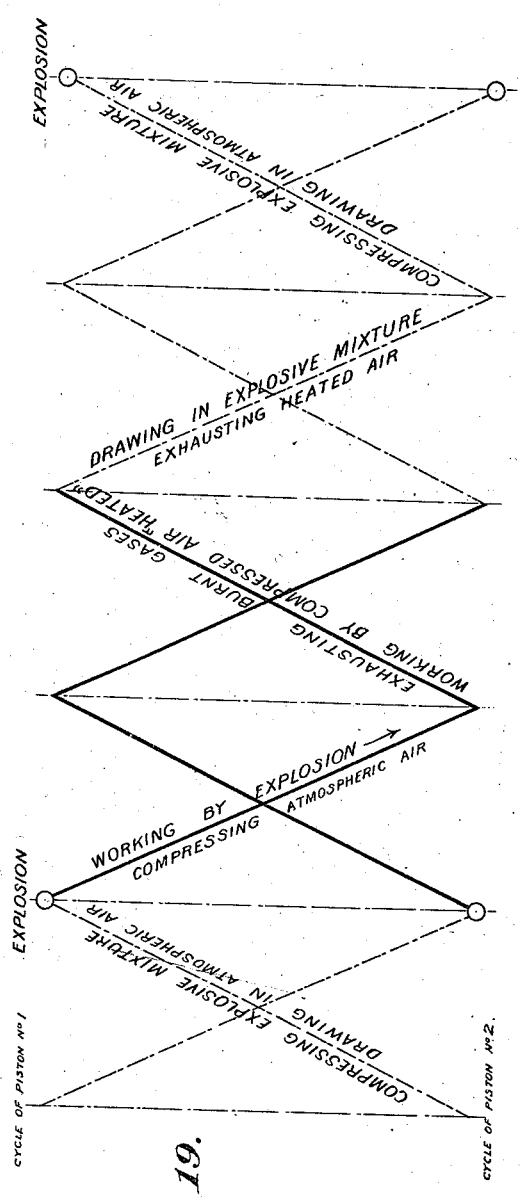
Figure 20:
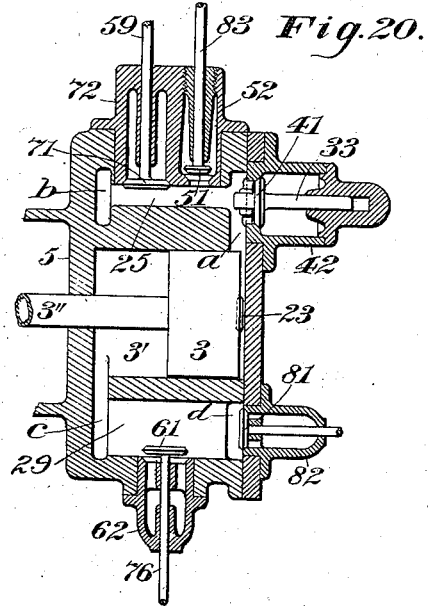
Figure 21:
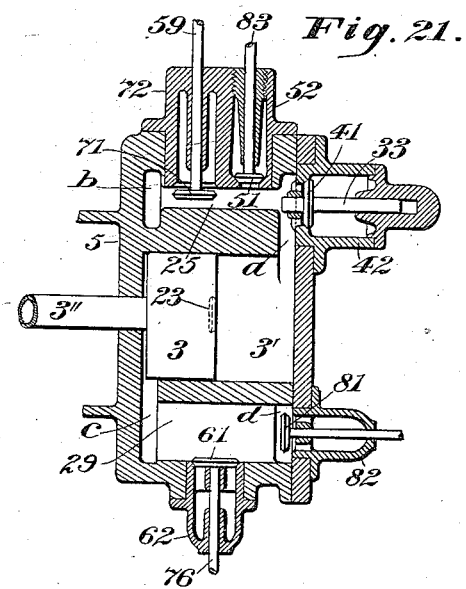
Figure 22:
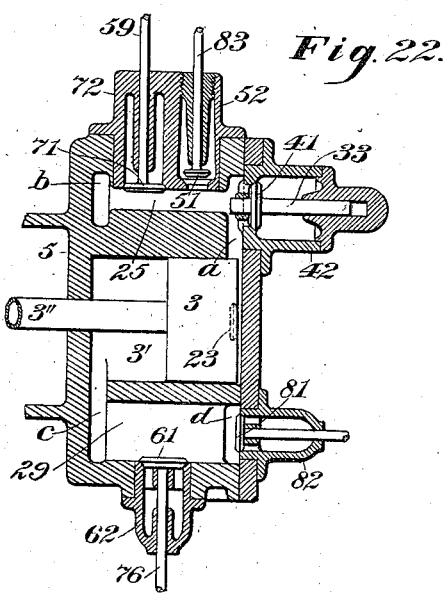
Figure 23:
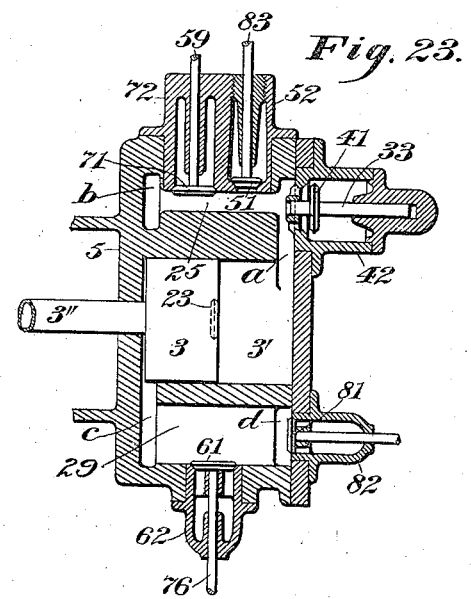

In the drawings accompanying and forming part of this specification, Figure 1 is a plan view of one form of this improved engine, a part thereof being shown in section, a part of the casing being broken away, a part of the piston mechanism in dotted lines, and with the storage and heating-tank apparatus, shown at the right in Fig. 2, removed. Fig. 2 is a view of that side of the engine shown at the bottom of Fig. 1. Fig. 3 is a view of that end of the engine shown at the right-hand in Fig. 2, with the air-storage and heating-tank apparatus removed. Fig. 4 is an enlarged sectional view, taken in line $a$—$a$, Fig. 3, looking toward the right, such view being developed as though the sectional line $a$—$a$ was laid out flat, and illustrating the operation of piston No. 2 of the set numbered 1 and 2. Fig. 5 is an end view of the engine-casing, on a relatively small scale, with the operating mechanisms detached. Fig. 6 is a sectional view thereof taken in line d—d, Fig. 5. Figs. 7, 8, 9, 10, 11, 12, and 13 are detail views of the cam mechanism for controlling the operation of the air mechanism. Figs. 14, 15, 16, and 17 are sectional views, taken in line b—b, Fig. 3, looking toward the right, and illustrate a cycle of operation of one pair of the pistons, as, for instance, pistons numbered 3 and 4, the illustration particularly representing the operation of piston No. 3, (see Figs. 1 and 3,) such views being developed as though said section-line b—b was laid out flat. Fig. 18 is a diagrammatic view illustrating the cycle of operation of the piston shown in said Figs. 14, 15, 16, and 17, and therefore of pistons Nos. 3 and 4. Fig. 19 is a diagrammatic view of the cycle of operation of the opposite pair of pistons, and therefore of pistons Nos. 1 and 2, which cycle of operation takes place simultaneously with the cycle shown in Fig. 18. Figs. 20, 21, 22, and 23 are sectional views similar to Figs. 14, 15, 16, and 17 and also taken in line b—b, Fig. 3, looking toward the right, and illustrate a cycle of operation of one pair of the pistons, as, for instance, pistons numbered 3 and 4, and particularly illustrate the operation of piston No. 3, during the utilization of the air mechanism in the starting of the engine, such views being developed as though said section-line b—b was laid out flat. Fig. 24 is a diagrammatic view illustrating the cycle of operation shown in Figs. 20, 21, 22, and 23, and therefore of the pair of pistons numbered 3 and 4, during the starting operation of the engine; and Fig. 25 is a diagrammatic view illustrating the cycle of operation of the opposite pair of pistons, and therefore of pistons numbered 1 and 2, during such starting operation, such cycle taking place simultaneously with the cycle shown in Fig. 24.

Similar characters of reference designate like parts in all the figures of the drawings.

I desire to state that the organization herein shown and described may be more or less varied without departure from the scope of the invention, which comprises in a general way a plurality of pistons in operative connection with a combustion mechanism and an air mechanism and so organized that the force which operates at one side of one of the pistons simultaneously operates at the other side of another piston, so that said pistons are simultaneously operative in opposite directions, each under a force equal to the force exerted on its companion piston, and that whatever organization accomplishes this result and presents an organization in which the cylinders have an air-starting mechanism and a combustion mechanism in connection therewith, or an organization in which the cylinders have an air mechanism for assisting the combustion mechanism in the running of the engine, is considered within the scope of this invention.

For the purpose of facilitating a complete understanding of the present apparatus it is desired that it be kept in mind that in the present instance the organization presents a series of four piston-cylinders assembled in sets of two, each set having in communication therewith a combustion-chamber and an air-chamber, and that while all four piston-cylinders are in operation simultaneously, nevertheless, each set of said cylinders is operative independently of the other set; and in the present instance while one set of said cylinders is working the other set is running idle—that is to say, while one set of said pistons is running by means of an explosion or by compressed air, the other set is not imparting any movement to the engine, although it is performing certain steps in the necessary cycle. This will be more clearly understood by an examination of Figs. 18 and 19, in which the heavy lines indicate the working strokes of the pistons, while the dotted lines indicate the idle strokes of the pistons or those strokes in which it is in one sense running idle. It will be further noted that since the engine involves an air mechanism and a combustion mechanism, these mechanisms are so organized (see Figs. 14, 15, 16, and 17) that the air is always effective at one side of one piston and the opposite side of the companion piston, while the combustible material is always effective at the opposite side of said first piston and the other side of said companion piston. In other words, the air is effective always on the same side of the piston, while the combustible material is always effective on the opposite side of the same piston.

This improved gas-engine comprises in the preferred form thereof, (herein shown and described,) a plurality of piston-cylinders, (shown herein as four in number and assembled in sets of two,) each of which cylinders has a piston working therein; a plurality of combustion-chambers, (shown herein as two in number) one in communication with each set of said cylinders, so that on an explosion in each combustion-chamber the explosive gases will pass simultaneously into each of said cylinders, said combustion-chambers having induction and eduction passages or ports to permit the inflow and outflow of fresh and spent combustible material, respectively, the induction and exhaust thereof being effected in the present instance by means of the pistons; means in communication with the combustion-chambers for supplying combustible material thereto; a plurality of air-chambers, (shown herein as two in number,) one in communication with each set of said piston-cylinders, whereby compressed air will pass simultaneously into each of said cylinders, said air-chambers having a plurality of induction-ports and passages, one for the admission of atmosphereic air and the exhaust at one predetermined time of compressed air heated, another for the passage of such atmospheric air, and at one time the passage of the compressed air heated into the main storage-tank, and another for the admission of such compressed air heated; a tank apparatus in communication with the air-chambers, such apparatus comprising a storage-tank and a heating-tank, the latter in communication with the combustion-chamber, whereby the exhaust-products of combustion may be utilized for the heating of compressed air to thereby render the same more effective; means for controlling the air apparatus so as to render the same self-starting by the utilization of the air; and means for reversing said engine.

In the present instance the engine is shown comprising a series of four piston-cylinders 1', 2', 3', and 4', assembled in sets, as 1'—2' and 3'—4', and these cylinders are shown formed in a casing 5, which constitutes the framework of the engine and is adapted to inclose the pistons and piston-cranks; and in the present apparatus this casing is provided with a pair of clamps 6 for attachment to a part of the running-gear—as, for instance, the rear axle of a vehicle, such axle carrying a gear to mesh with the gear hereinafter mentioned. This casing is provided with air-holes or openings 7 for the passage of air to the interior thereof, and is also provided with removable plates 8 so that the various parts of the engine can be readily assembled or inspected.

Disposed in these cylinders are pistons 1, 2, 3, and 4, one in each cylinder, the rods 1'', 2'', 3'', and 4'' of which are suitably connected with a driving-shaft 9, having crank-disks suitably supported in bearings of the casing, and which shaft carries a gear 10, adapted to mesh with the gear carried on the vehicle-axle, whereby on the operation of the pistons the axle will be rotated, and thereby the wheels of the vehicle, to drive the same.

Each piston or piston-head is suitably provided with packing-rings 12 to form an air-tight connection with the walls of its piston-cylinder, and each piston-rod, to which the head may be secured in any suitable manner—as, by a threaded connection—projects through a suitable stuffing-box 13, one member, as 14 of each piston-rod being provided with a journal 15, projecting at each side thereof, while the other member, 16, thereof (shown herein as that member which is secured to the cranks of the driving-shaft) is provided with a journal-bearing 17, having a removable cap 18 for the reception of said journal. Each rod is provided with a projecting guide or shoe 19, in engagement with guideways 20, carried by the casing or framework, whereby the pistons are properly guided in their reciprocatory movements. That member of the piston-rod which is secured to the piston-head, together with its journal 15, is apertured or formed hollow, whereby a conduit is formed communicating with the interior of the casing and a chamber 21, formed in the piston-head. This chamber is in communication with the piston-cylinder by a valve-controlled port 22.

Disposed in each of the pistons or piston-heads is a valve 23, effective at a predetermined period to permit the passage of air from the interior of the casing, into which it has been admitted through the openings 7 thereof, through the hollow piston-rod into the piston-cylinder, from whence at the proper period it is compressed into the storage-tank.

Located in position to communicate with the piston-cylinders (and herein shown formed within the casing) is a plurality of air-chambers, (shown in the present instance as two in number, 25 and 26,) one for each set of piston-cylinders. Each of these air-chambers communicates with one of the cylinders of one set adjacent to one end thereof by a passage a, and with the other cylinder of the same set adjacent to the other end thereof by a passage b, so that the effective action of the air will take place simultaneously at one side of one piston and at the opposite side of its companion piston.

Located in position (and shown herein as formed within the casing) is a plurality of combustion-chambers in communication with said cylinders, such combustion-chambers in the present instance comprising two chambers 29 and 30, one in communication with each set of cylinders adjacent to one end of one cylinder by a passage c, and the opposite end of the other cylinder by a passage d, so that the effective action of the explosive material will take place simultaneously at one side of one piston and at the opposite side of its companion piston. In the present instance the organization is such that the air-chamber communicates with one end of one cylinder, while the combustion-chamber communicates with the opposite end of the same cylinder, so that in operation the air will always be effective at the same sides of the pistons, while the combustible material will always be effective at the opposite sides of such pistons—that is to say, the air will be effective at one side of one piston and the opposite side of its companion piston, while the explosive material will be effective at the sides of said pistons opposite to those acted upon by the air.

Suitably connected with the engine is an air-storage tank 35, having a water-reservoir 36, around which an air-compartment 37 is formed. This air-storage tank communicates by a suitable conduit 38, including a branch 39, with a pair of valve-casings 42, (shown in the present instance formed on the ends of the air-chambers 25 and 26,) a suitable valve 41, having a stem 33, carrying a spring 34, being located in each of said valve-casings for controlling the admission of atmospheric air under pressure to the storage-tank. This valve is forced open at the proper time by the action of the pistons in compressing the atmospheric air. In communication with this storage-tank by a suitable conduit 40 is an air-heating tank or reservoir 43, which in turn communicates, by a suitable conduit 44 and its branch 45, with a pair of valve-casings 52, (shown herein formed at the sides of the air-chambers.) In these casings are disposed spring-actuated valves 51 for controlling the admission of heated air to the air-chambers. In the conduit 40, intermediate the storage-tank and the heating-tank, is disposed a check-valve 47, operative to prevent the backward flow of the air after it passes from the storage-tank. In the same conduit there is also located a regulator-valve 48, operative by hand or otherwise to cut off the supply of air from the storage-tank to the heater, whereby on the opening of this valve the air from the storage-tank, and which is under pressure, will force its way into the heating-tank, where it is heated in the manner hereinafter set forth, after which it passes through the conduits 44 and 45 into the air-chambers when the valves are open. When it is desired to stop the engine, this regulator-valve is operated to cut off the supply of compressed-air from the storage-tank. This heating-tank 43 is in communication, by a suitable conduit 49 and its branch 50, with the combustion-chambers 29 and 30, by means of valve-casings 62, (shown herein formed at one side of the combustion-chambers,) which carry suitable valves 61, controlling the exhaust, whereby when the products of combustion are forced out by the pistons they pass through the branch 50 and conduit 49 into the heating-tank 43, where such exhaust products are utilized to heat the compressed air from the storage-tank, thereby increasing its efficiency before its admission into the air-chambers. From this it will be readily seen that the heat of the products of combustion instead of being wasted is utilized to increase the efficiency of the compressed-air.

To secure a supply of atmospheric air in addition to that obtained through the hollow piston-rod, each air-chamber is shown provided at one side thereof with a valve-casing 72, carrying a valve 71 for controlling the admission of such air, and which valve-casings are in communication, by conduits 53, with a perforated air-box 54, whereby at the proper predetermined period air is admitted to the air-chamber and simultaneously with its admission thereto through the piston-rod, such air, in the further operation of the pistons, being forced out past the valve 41 into the storage-tank. In the present instance each valve 71 is shown mechanically operative at one period to control the exhaust of air, and operative by suction at another period to control the admission of atmospheric air, and for this purpose the valve-stem 59 of said valve carries a spring 60, disposed intermediate a stop, such as an adjustable nut 63, carried on said stem and the outer wall of the valve-casing 72, such spring acting to maintain the valve on its seat and so cut off the passage of atmospheric air to the air-chamber, while it permits the opening of the valve at one period by the suction created by the pistons and allows the drawing in of such atmospheric air. For the purpose of mechanically operating these valves 71 at the proper time to permit the exhaust of compressed air heated from the air-chambers after it has performed its work, suitable means is provided. In the form shown this means, which is in duplicate, (one for each of said valves 71,) so that a description of one will be sufficient, comprises a rocking-lever 64, carried by a suitable bracket 65, secured to the cylinder-casing, one arm, 64', of said lever engaging the valve-stem 59, and the other arm, 64'', thereof carrying a roll 66, in engagement with a cam 67, mounted on a cam-shaft 68, carrying at one end thereof a bevel-gear 69, in mesh with a bevel-gear 70, carried on a stub-shaft 73, which stub-shaft carries a gear 74, in mesh with a pinion 75 on the main driving-shaft 9, so that on the operation of the pistons the driving-shaft 9 is rotated to rotate this cam-shaft 68, through the medium of the gearing, and thereby the cam 67, whereupon at one predetermined period in the cycle of operation the rocking-lever 64 is operated to force the valve-stem, and thereby the valve 71, inwardly against the action of its spring, (see Fig. 15,) and permit the exhaust of the heated air from the air-chamber.

For supplying combustible material to the combustion-chambers to permit the same to be ignited and have the explosive gases thereof operate the pistons, some suitable means may be provided. In the present instance this means is shown as a carbureter 55, which may, if desired, be substantially similar in construction to that described in my prior application, Serial No. 681,506, filed May 23, 1898, and to which application reference may be had for a more particular description thereof, since this carbureter in itself constitutes no inventive part of the present improvement. This carbureter 55 has in communication therewith an oil-supply conduit 56, leading from some suitable source of oil-supply, and communicates by a pair of conduits 57 with the combustion-chambers, such communication being controlled by valves 81, carried in casings 82, (shown herein formed at the ends of said combustion-chambers 29 and 30,) and which valves are opened at the proper time by suction to admit the combustible material. Each combustion-chamber is provided with a suitable igniting device 58, which may be an electric-sparking mechanism, if desired.

For controlling the exhaust of the products of combustion suitable valve mechanism is provided, and since in the present structure this is in duplicate a description of one mechanism is deemed sufficient. The exhaust-valve 61 has its stem 76, carrying a spring 77, located intermediate the outer end of the valve-casing 62 and a stop, comprising, for instance, a pair of nuts 78 and 78', one acting as a check-nut, turned on the end of such stem, such spring maintaining the valve on its seat. Carried by the bracket 65 is a suitable rocking-lever 78'', one member, 78''', of which is in engagement with the outer end of the valve-stem 76, while the other member, 78'''', thereof carries a roll 79, in engagement with a cam 80, mounted on the cam-shaft 68. On the rotation of said cam-shaft 68 and cam 80 the lever is at one predetermined period operated to depress the valve-stem against the action of its spring and so open the exhaust-valve 61 to permit the exhaust of the products of combustion.

For controlling the admission of compressed-air heated from the heating-tank 43 to the air-chambers 25 and 26 valve mechanism substantially similar to that just described is provided. In the present instance each of the valve-stems 83 of the valves 51 is provided with a spring 84, located intermediate the outer end of the valve-casing 52 and a collar 85, mounted on said stem and effective to maintain the valve open to thereby permit the passage of the compressed-air heated from the heating-tank to the air-chamber. For maintaining each of these valves 51 closed, thereby to prevent the passage of such compressed heated air, a rocking-lever 86 is shown mounted on the bracket 65, one member, 86', of said lever being provided with a forked end in engagement with the collar 85 of said valve-stem, while the other member, 86'', thereof carries a roll 87, in engagement with a compound or two-part cam 90, mounted on the cam-shaft 68. This two-part cam is so constructed and assembled that the valve will be moved away from its seat by the spring to permit the passage of compressed air heated once during the ordinary running cycle and twice during the starting cycle. This cam mechanism, which is in duplicate, (one in operative connection with each valve 51,) comprises a fixed cam 91, secured to the cam-shaft 68 and rotatable therewith, and a movable cam 92, mounted on said shaft for rotation therewith and for movement independently thereof. This movable cam 92 is provided with a sleeve 93, having a curved slot or groove 94. Mounted on this cam-sleeve 93 is a reciprocatory member or sleeve 95, carrying a projection 96, extending into and movable, on the reciprocation of said sleeve 95, in a slot 97, formed in and extending longitudinally of said shaft 68, such projection 96 carrying a roll 98, in engagement with the curved groove 94 of the cam-sleeve, whereby it will be seen that as the reciprocatory sleeve 95 is shifted inwardly, for instance from the position shown in Fig. 7 the roll 98 thereof will effect, by means of the curved groove 94, a rotary movement of said cam-sleeve 93, thereby to rotate the cam member 92 into the desired position. These cam members are so formed that when in one position (Fig. 9) they will have a pair of depressed surfaces 100 and 101, while in another position (Fig. 8) they will have but one depressed surface, 101'. In the present instance this is accomplished by forming each of said cam members 91 and 92 with a pair of raised surfaces 102—103 and 104—105, respectively, and a pair of depressed surfaces 102'—103' and 104'—105', respectively, and so assembling the same that in the ordinary running cycle of the engine the raised surfaces 104 and 105 of the cam 92 will be contiguous to and form continuations of the raised surfaces 102 and 103 of the cam 91, thereby forming a continuous raised surface (Fig. 8) having one depressed portion 101'. On the adjustment of the movable cam 92 in the direction of the arrow from the position shown in Fig. 8 to the position shown in Fig. 9 it will be seen that the raised surfaces 104 and 105 of said movable cam have been so adjusted relatively to the raised surfaces 102 and 103 of the fixed cam 91 that a pair of depressed surfaces 100 and 101 are formed. By this construction when the cam members are in the position shown in Fig. 8 the roll 87, carried by the rocking-lever 86, will be for a certain period in engagement with the continuous raised surface of the cam, whereby the valve 51 will be maintained closed against the action of its spring 84 to prevent the passage of compressed air heated to the air-chamber. When the cam is carried into position with its depressed surface 101' contiguous to the roll 87, the valve-spring 84 will operate to force the roll into such depression 101', and thereby permit the opening of the valve and the passage of compressed air heated into the air-chamber. When, however, the movable cam member 92 has been shifted relatively to the fixed cam member 91 so that a pair of depressed surfaces 100 and 101 are formed, (Fig. 9,) it will be seen that each time one of such depressed surfaces is contiguous to the roll 87 the valve-spring 84 will act to force the roll into such depression and open the valve to permit the passage of compressed air heated to the air-chamber. This latter action, however, is only necessary in the starting of the engine in the manner hereinafter described.

Some suitable means may be provided for shifting the sleeve 95, and thereby the two-part cam member 90, and will ordinarily comprise suitable connecting mechanism, and an actuating-lever, in position adjacent to the seat of the operator, whereby both of said shiftable sleeves 95, one on each cam-shaft 68, will be shifted simultaneously, so that one or the other of the cam mechanisms will be moved into position to permit one or the other of the valves 51 immediately to open and permit the passage of compressed air heated into the air-chamber to start the engine.

For effecting a reversal of the engine, when it is desired to reverse the vehicle, suitable means may be provided, (shown in duplicate and in connection with each cam-shaft 68). In the present instance each cam-shaft 68 is shown as a two-part member connected by a shiftable sleeve 110, (see Fig. 2,) splined to that member of said shaft which carries the beveled gear, whereby it is rotatable therewith and shiftable independently thereof. This sleeve is provided with a curved slot or groove 112. That member of the cam-shaft 68 which carries the cams is provided with a projection or roll 113, working in said groove 112. Intermediate said shiftable sleeve 110 and a fixed member or collar 114 on the shaft is a spring 115, effective to maintain the shiftable sleeve in position to permit the normal running of the engine. On the shifting of said sleeve by some suitable actuating means (not shown) the controlling member of which will be adjacent to the seat of the operator, it will be seen that the cam-carrying member of the cam-shaft will be rotated, owing to the projection and curved groove connection 112 and 113, and thereby reverse the movement of the cams and run the engine in the opposite direction.

I desire to state that if desired one set of the cylinders may be disconnected from the other set by some suitable means, whereby the passage of the combustible material to one combustion-chamber and the passage of the atmospheric air and compressed air heated to one air-chamber will be cut off. This result may be accomplished, if desired, by suitable cut-off valves disposed in the proper conduits.

Figure 14:
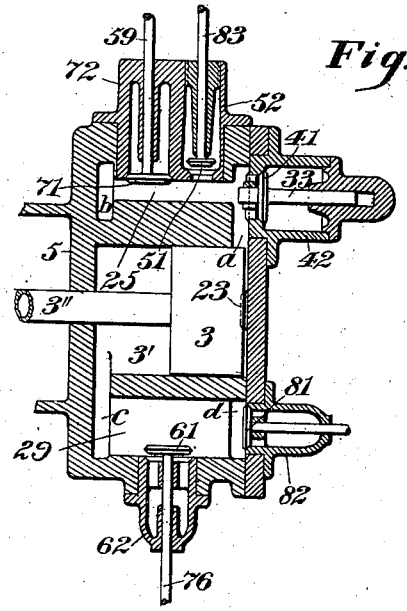
Figure 15:
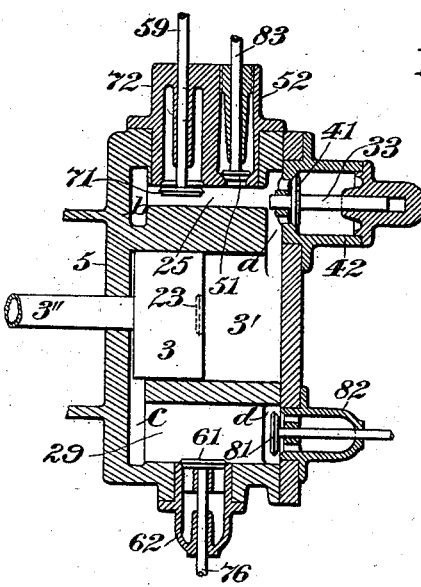
Figure 16:
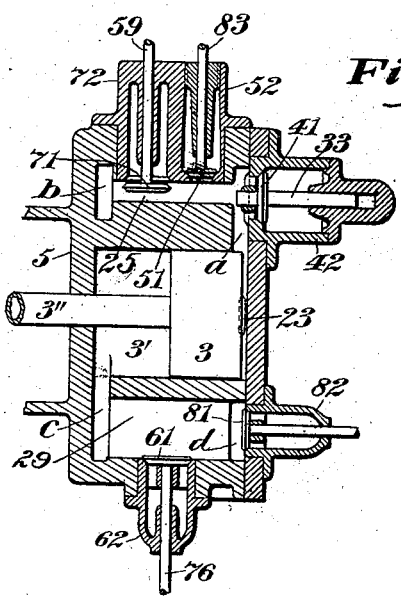
Figure 17:
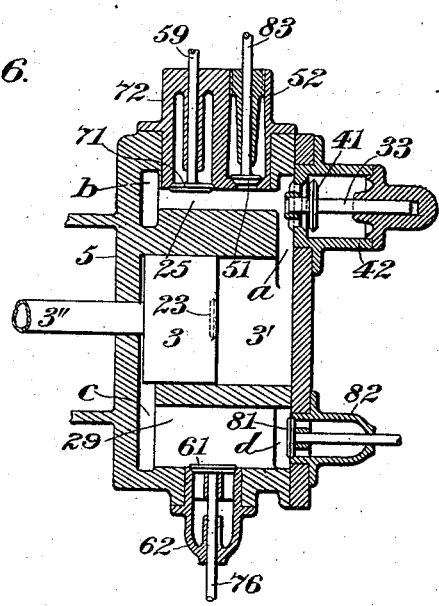

The operation of this improved engine, when constructed in the manner hereinbefore set forth, is substantially as follows: The position of piston No. 2 shown in Fig. 4 corresponds with the position of said piston shown in Fig. 1, the other piston of the same set—namely, piston No. 1—being at this time at the outer end of its piston-chamber. At this period it will be seen that all of the valves which open into the air-chamber 26 and into the combustion-chamber 30 are closed; and by reference to Fig. 4 it will be seen that as this piston No. 2 moves toward the outer end of its cylinder it will open the atmospheric air-valve 71 by suction, the air being drawn into the air-chamber and from thence through the passage b to the inner side of the piston No. 2, and through passage a to the outer side of piston No. 1. At the same time piston No. 1 in the opposite cylinder of this same set— since it is going inwardly—will have the valve 23 in its piston-head open and likewise permit atmospheric air drawn through its rod to enter the cylinder. During this movement of the pistons the opposite sides— namely, the outer side of piston No. 2 and the inner side of piston No. 1—will compress explosive mixture previously drawn in past the valve 81, which is now closed, the pistons continuing to perform their work, indicated for instance, by the diagram Fig. 18. During this period pistons Nos. 3 and 4, comprising the other set, will operate in a manner similar to that shown in Figs. 14, 15, 16, 17, and 18—that is to say, piston 3 being in the position shown in Fig. 14 is about to move inwardly toward the inner end of the piston-casing. This inward movement is effected by means of compressed air heated admitted at this time by the valve 51, which by means of the two-part cam 90 is permitted to open, so that compressed air heated passes from the heating-tank 43, through the conduit 44, into the air-chamber 25, and from thence through the passage a to the outer end of piston 3, and consequently through the passage b, to the inner end of its companion piston 4, whereby by the action of this compressed air heated the piston 3 is forced inwardly into the position shown in Fig. 15, during which inward movement it forces out the products of combustion resulting from a previous explosion through the passage c, while its companion piston forces out such products through the passage d into the combustion-chamber 29 and from thence through the exhaust-valve 61, which has been opened by its cam 80 at this time, (Fig. 14.) On the outward movement of piston 3 from the position shown in Fig. 15 to the position shown in Fig. 16 the compressed air heated, just previously admitted, is forced out by the piston 3 through the passage *a*, and by its companion piston, through the passage *b* into the air-chamber, and from thence past the atmospheric-air valve 71, which acts at this time as an exhaust-valve and is mechanically opened by its cam 67, into the outer air. (Fig. 15.) At the same time the combustible-supply valve 81, Fig. 15, is opened by the suction created by the pistons and a supply of combustible material drawn into the combustion-chamber through the passage *c* to the inner side of piston 3, and through passage *d* to the outer side of its companion piston in readiness to be compressed, whereby on the inward movement of piston 3 from its position shown in Fig. 16 this explosive mixture will be compressed by the inner side of said piston, through the passage *c*, into the combustion-chamber, and by the outer side of its companion piston through the passage *d*, while at the same time the outer side of piston 3 acts by suction to open the atmospheric-air valve 71, Fig. 16, and draws in air into the air-chamber through the passage *a*, the inner side of the companion piston doing the same through the passage *b*, the valve 23 in the piston-head of piston 3 being likewise opened at this time to permit the passage of air through the hollow piston-rod into the cylinder. At this time, piston 3 having reached the position shown in Fig. 17, whereby the explosive material is compressed as just set forth, an explosion takes place, the explosive gases of which act on the inner side of said piston 3 and the outer side of its companion piston to force the former outward and the latter inward, during which time the piston 3 forces the previously drawn-in atmospheric air through passage *a*, while its companion piston forces such air through passage *b* past the valve 41 into the storage-tank 35, where it is held under pressure, thereby completing a cycle of operation, the piston 3 being again in the position shown in Fig. 14 and in readiness to be again operated by the admission of compressed-air heated.

Presuming now that the engine has been stopped and it is desired to start the same, this is accomplished by the compressed-air heated, which acts in a similar manner to the explosive mixture when ignited. To accomplish this purpose in an effective manner, the reciprocating sleeves 95 are shifted by the operator, whereby the movable member 92 of the two-part cam 90 is so shifted that it will form with the fixed member 91 of said cam a pair of depressed spaces 100 and 101. By this operation one or the other of these cam mechanisms will be so positioned that one or the other of the compressed-air valves will be immediately opened by its spring, and presuming in this instance that it is the compressed-air valve 51 shown in connection with air-chamber 25 of pistons 3 and 4, it will be seen by reference to Figs. 20, 21, 22, 23, and 24 that said valve 51, having opened, compressed air heated is admitted to the air-chamber 25, and from thence through the passage *a* to the outer side of piston 3, and through passage *b* to the inner side of its companion piston, thereby forcing the piston 3 inwardly, and consequently the other piston outwardly, the opposite sides of which act on the products of combustion resulting from a previous explosion, and which have not been exhausted, to force the same out through passages *c* and *d* into the combustion-chamber, and thence past the exhaust-valve 61, Fig. 20, which at this time is opened by its cam. At this time if the operator perceives that the engine will continue in operation, an explosion in the other set of cylinders having been effected, the shiftable sleeve 95 may be drawn back into position, whereby the ordinary running cycle will continue from the point *y* in Fig. 18. If, however, the engine is not sufficiently started at this time, the sleeves 95 will be permitted to remain in their shifted positions, whereby on the return or outward stroke of piston 3 from the position shown in Fig. 21 it will force out the compressed air heated through the passage *a*, while its companion piston will do the same through the passage *b* and by the valve 71, which is mechanically opened at this time by its cam, into the open air. At the same time such piston 3 draws in explosive mixture past the valve 81 and through the passage *c*, while the companion piston is doing the same through the passage *d*. On the inward movement of the piston 3 from the position shown in Fig. 22, which is effected by compressed-air heated again admitted through the valve 51, since it will be remembered that the two-part cam members 91 and 92 have been so adjusted, that the depressed portions 100 and 101 are operative twice during each cycle instead of once as in the ordinary running cycle, the piston compresses the explosive mixture previously admitted, the companion piston performing the same operation, whereupon an explosion takes place, forcing said piston 3 outwardly from the position shown in Fig. 23, whereupon, since there is compressed-air heated in the piston-chamber at the outer side of said piston 3 and at the inner side of its companion piston, it follows that since the atmospheric valve is shown opened only once during each cycle by the cam, which permits, during the ordinary running cycle, the exhaust of such heated air, such compressed-air in this instance is exhausted by being forced into the storage-tank 35, past the valve 41, the pressure of the pistons combined with the expanding pressure of the heated air being greater than the compressed-air in the tank, so that said valve will be opened against the pressure of the air in the tank to permit the exhaust of the compressed-air heated into said tank. When it is found that the engine is sufficiently started the sleeves 95 are shifted into their normal positions.

From the foregoing it will be seen that the engine is provided with a self-starting mechanism involving the application of compressed-air heated, and that such air is compressed by the pistons of the engines into the storage-tank and at the proper period is rendered more efficient by heating the same by the utilization of the exhaust products of combustion, which would ordinarily go to waste, and that, furthermore, this compressed-air heated is admitted into the cylinders at a time when such cylinders are in a heated condition owing to a previous explosion, so that its efficiency is still materially increased, whereby it is effective to act upon the pistons to maintain the same in operation intermediate the explosions. Moreover, by admitting the heated air into the same cylinder which has just previously forced out atmospheric air it will be readily understood that such atmospheric air as is necessarily left may be utilized to perform work. Moreover, it will be seen that this compressed-air heated in expanding against the cylinder-walls previously used for an explosion will aid in keeping them at a proper temperature, so that they will not need so much cooling, and thereby the apparatus gain in efficiency, since ordinarily a great deal of the energy is carried off by the water of the cooling-jacket usually surrounding the piston-chambers.

It will also be seen, in this organization, that at the time of the drawing-in of atmospheric air by the pistons the piston-cylinders are the coolest, since this action of the pistons is just previous to an explosion, so that the tendency of the cool air is to maintain the cylinder-walls against becoming too highly heated, it being immaterial whether the walls are cool or not at this time, while when the compressed-air heated is admitted it is admitted at a time when the cylinders are the hottest, so that such heated air continues to be expanded, thereby increasing the power and efficiency thereof.

In conclusion I desire to state that by means of this organization I am able to provide an engine small in size but having an increased effectiveness as compared with engines of larger size, whereby the same can be effectively used for propelling heavy vehicles.

I desire to state that the term "crank mechanism" as used in the claims is to be interpreted to include any means to which motion may be imparted by the piston-rods, this term being used to broadly cover any medium adapted to be connected with, or operated by, the pistons.

Having described my invention, I claim—

1. In a gas engine the combination of a plurality of cylinders; pistons working therein and connected with means to be operated thereby, a fluid chamber having communication with said cylinders; and a combustion chamber in communication with one end of one cylinder and the opposite end of the other cylinder so that the pistons move simultaneously in opposite directions under the pressure exerted by the explosive charge.

2. The combination with a pair of cylinders; pistons working therein and connected with means to be operated thereby; an air chamber in communication with one end of one cylinder and with the opposite end of the other cylinder, and a combustion chamber in communication with the other ends of the first cylinder and with the first end of the other cylinder.

3. The combination of a pair of cylinders, a piston in each of said cylinders and connected with crank mechanism, an air chamber communicating with both of said cylinders to permit air under pressure to be simultaneously effective at one side of one piston and at the opposite side of the other piston, and a combustion chamber communicating with both of said cylinders to permit the pressure of exploded material to be simultaneously effective at the other sides of said piston.

4. The combination of a pair of cylinders; pistons working therein and having rods connected with crank mechanism; an air-chamber in communication with the outer end of one cylinder and with the inner end of the other cylinder; a combustion-chamber in communication with the inner end of that cylinder with which the air-chamber is in communication at the outer end thereof and in communication with the outer end of that cylinder with which the air-chamber is in communication at the inner end thereof.

5. The combination of a pair of cylinders; a piston working in each cylinder and connected with crank mechanism; means for supplying a non-combustible fluid to one side of one piston and to the opposite side of the other piston simultaneously; and means for supplying combustible material to the other sides of said pistons simultaneously.

6. The combination of a pair of cylinders; pistons working therein and connected with crank mechanism; an air chamber located at one side of and in communication with both of said cylinders so that both pistons will be operated in one direction by air; and a combustion chamber also located at one side of and in communication with both of said cylinders so that both pistons will be operated in the opposite direction by the force of the explosive material.

7. The combination of a pair of cylinders; pistons working therein and having rods connected with crank mechanism; a fluid-chamber located at one side of and in communication with one end of each of said cylinders; and a combustion-chamber also located at one side of and in communication with those ends of both of said cylinders not in communication with the fluid chamber.

8. The combination of a pair of cylinders; pistons working therein and having rods connected with crank mechanism; a fluid-chamber located at one side of and in communication with one end of each of said cylinders by obliquely-located passages; and a combustion-chamber also located at one side of and in communication with those ends of both of said cylinders not in communication with the fluid chamber by obliquely-located passages.

9. The combination of a pair of cylinders; pistons working therein and having rods connected with crank mechanism; a pair of chambers, one for the reception of one power producing material and the other for the reception of a different power producing material, the one in communication with one end of one of the cylinders, and the other in communication with the other end of the same cylinder, and the other in communication with one end of the other cylinder and the other in communication with the other end of the same cylinder; and means for controlling the operation of said cylinders.

10. The combination of a pair of cylinders; pistons working therein and having rods connected with crank mechanism; a pair of chambers one for the reception of one power producing material, and the other for the reception of a different power producing material, each in communication with one end of one cylinder and with the opposite end of the other cylinder, the communication of one chamber with one cylinder being at one end thereof, and the communication of the other chamber with the same cylinder being at the opposite end thereof; and means for controlling the operation of said chambers.

11. The combination of a pair of cylinders; pistons working therein and connected with crank mechanism; an air chamber in communication with one end of each of said cylinders; a combustion chamber in communication with the opposite end of each of said cylinders; means for supplying air under pressure to the air chamber; and means for supplying combustible material to the combustion chamber.

12. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for supplying air under pressure to said air-chamber; and means for controlling the supply of such air to said air-chamber.

13. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for supplying air under pressure to said air-chamber; and means for controlling the exhaust of such air from said air-chamber.

14. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for supplying air under pressure to said air-chamber; means for controlling the supply of such air to said air-chamber; and means for controlling the exhaust of such air therefrom.

15. The combination of a pair of cylinders; pistons working therein and having rods connected with crank mechanism; means for supplying air under pressure to one side of one piston and to the opposite side of the other piston; means for supplying combustible material to the opposite side of the first piston and to the other side of the second piston; and means alternately operative for controlling the admission of such air and combustible material.

16. The combination of a pair of cylinders; pistons working therein and having rods connected with crank mechanism; a combustion-chamber in communication with both of said cylinders; an air-chamber also in communication with both of said cylinders; and means for alternately admitting air under pressure and combustible material to the opposite ends of said cylinders.

17. The combination of a pair of cylinders; pistons working therein and having rods connected with crank mechanism; an air-chamber in communication with said cylinders adjacent to one end of one and the opposite end of the other; a combustion-chamber in communication with said cylinders adjacent to one end of one and the opposite end of the other; and means alternately operative for controlling the admission of combustible material and air under pressure to the opposite ends of said cylinders.

18. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for supplying air to said air-chamber; means for controlling the supply of air to the air-chamber; and means for controlling the supply of explosive material to the combustion-chamber.

19. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for supplying air to said air-chamber; means for controlling the supply of air to the air-chamber; means for controlling the supply of explosive material to the combustion-chamber; means for controlling the exhaust of air from said air-chamber; and means for controlling the exhaust of the spent products of combustion from said combustion-chamber.

20. A gas-engine comprising a pair of cylinders; a piston in each of said cylinders and having a rod connected with crank mechanism; an air-chamber communicating with both of said cylinders to permit air under pressure to be exerted simultaneously at one side of one piston and at the opposite side of the other piston; a combustion-chamber communicating with both of said cylinders to permit the pressure of exploded material to be exerted simultaneously at one side of one piston and at the opposite side of the other piston, the organization being such that the air and combustible material are effective at opposite sides of the same piston; valve mechanism alternately operative to control the admission of air under pressure and explosive material; and valve mechanism alternately operative to control the exhaust of such air and the spent products of combustion.

21. A gas-engine comprising a pair of cylinders; a piston in each of said cylinders and having a rod connected with crank mechanism; an air-chamber communicating with both of said cylinders in such manner that the air under pressure will be exerted at one side of one piston and at the opposite side of the other piston simultaneously; a combustion-chamber communicating with both of said cylinders in such manner that the pressure of exploded material will be exerted at one side of one piston and at the opposite side of the other piston simultaneously, the organization being such that the air and combustible material are effective at opposite sides of the same piston; means for controlling the admission of air under pressure to said air-chamber; means for controlling the admission of combustible material to the combustion-chamber; and means for igniting said combustible material in the combustion-chamber.

22. A gas-engine comprising a pair of cylinders; a piston in each of said cylinders and having a rod connected with crank mechanism; an air-chamber communicating with both of said cylinders to permit air under pressure to be exerted at one side of one piston and at the opposite side of the other piston simultaneously; a combustion-chamber communicating with both of said cylinders to permit the pressure of exploded material to be exerted at one side of one piston and at the opposite side of the other piston simultaneously, the organization being such that the air and combustible material are effective at opposite sides of the same piston; means for controlling the admission of air under pressure to said air-chamber; means for controlling the exhaust of such air; means for controlling the admission of combustible material to the combustion-chamber; means for igniting such combustible material in the combustion-chamber; and means for controlling the exhaust from said combustion-chamber.

23. The combination of a pair of cylinders; pistons working therein and having rods connected with crank mechanism; an air-chamber in communication with one end of one cylinder and with the opposite end of the other cylinder; a combustion-chamber also in communication with one end of one cylinder and with the opposite end of the other cylinder, the organization being such that the air and combustible material are effective at opposite sides of the same piston; means for supplying explosive material to said combustion-chamber; means for supplying air to said air-chamber; and means for heating such air before its passage into said air-chamber.

24. The combination of a pair of cylinders; pistons working therein and having rods connected with crank mechanism; means for supplying air under pressure to one side of one piston and the opposite side of the other piston simultaneously; means for supplying combustible material to one side of one piston and the opposite side of the other piston simultaneously, the organization being such that the air and combustible material are effective at opposite sides of the same piston; and means effective to apply the heat resulting from the spent products of combustion of such combustible material to said air to heat the same before it is supplied to said pistons.

25. The combination of a pair of cylinders; pistons working therein and having rods connected with the crank mechanism; an air-chamber in communication with one end of one cylinder and with the opposite end of the other cylinder; a combustion-chamber in communication with one end of one cylinder and with the opposite end of the other cylinder, the organization being such that the air and combustible material are effective at opposite sides of the same piston; means for supplying air to said air-chamber; and means in communication with said combustion-chamber to effect the heating of the air before its supply to said air-chamber.

26. The combination of a pair of cylinders; pistons working therein and having rods connected with crank mechanism; an air-chamber in communication with both of said cylinders; a combustion-chamber in communication with both of said cylinders, the organization being such that the air and combustible material are effective at opposite sides of the same piston; an air-storage tank; and means in communication with said air-chamber and storage-tank to effect the heating of the air from said storage-tank prior to its passage into said air-chamber.

27. The combination of a pair of cylinders; pistons working therein and having rods connected with crank mechanism; an air-chamber in communication with both of said cylinders; a combustion-chamber in communication with both of said cylinders, the organization being such that the air and combustible material are effective at opposite sides of the same piston; an air-storage tank; and means in operative connection with said air-chamber, storage-tank, and combustion-chamber to effect the heating of the air from said storage-tank prior to its passage to the air-chamber.

28. The combination of a pair of cylinders; pistons working therein and having rods connected with crank mechanism; an air-chamber in communication with one end of one cylinder and with the opposite end of the other cylinder; a combustion-chamber in communication with one end of one cylinder and with the opposite end of the other cylinder, the organization being such that the air and combustible material are effective at opposite sides of the same piston; an air-storage tank; and a receptacle in operative connection with said air-chamber, storage-tank, and combustion-chamber to effect the heating of the air before its passage to the air-chamber.

29. The combination of a pair of cylinders; pistons working therein and having rods conected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; an air-storage receptacle; means in operative connection with the air-chamber, storage-receptacle, and combustion-chamber to effect the heating of the air before its passage to the combustion-chamber; and means for controlling the supply of such air to said air-chamber.

30. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; an air-storage tank; means in operative connection with the air-chamber, storage-tank, and combustion-chamber to effect the heating of the air before its passage to the air-chamber; and mechanically-operative valve mechanism for controlling the supply of heated air to said air-chamber.

31. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; an air-storage tank; means in operative connection with the air-chamber, storage-tank, and combustion-chamber to effect the heating of the air before its passage to the air-chamber; and valve mechanism for controlling the exhaust of such air from the air-chamber.

32. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; an air-storage tank; means in operative connection with the air-chamber, storage-tank, and combustion-chamber to effect the heating of the air before its passage to the air-chamber; valve mechanism for controlling the supply of combustible material to said combustion-chamber; valve mechanism for controlling the exhaust of the spent products of combustion therefrom; and valve mechanism for controlling the supply of heated air to said air-chamber.

33. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for controlling such supply; an air-storage tank in communication with said air-chamber to receive air under pressure therefrom; means for controlling the admission of atmospheric air to said air-chamber; means for controlling the admission of air from said air-chamber to said storage-tank; a heating-tank in operative connection with the air-chamber, storage-tank, and combustion-chamber; means for controlling the passage of the products of combustion from said combustion-chamber to said heating-tank; and means for controlling the passage of heated air from said heating-tank to said air-chamber.

34. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; valve mechanism for controlling such supply; an air-storage tank in communication with said air-chamber; means for controlling the admission of atmospheric air to said air-chamber; means for controlling the passage of air from such chamber to the storage-tank; a heating-tank in operative connection with the air-chamber, the combustion-chamber, and storage-tank; means for controlling the passage of the products of combustion from said combustion-chamber to said heating-tank; means for controlling the passage of heated air from said heating-tank to said air-chamber; and means for controlling the passage of air from the storage-tank to the heating-tank.

35. The combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; means for controlling such supply; an air-storage tank in communication with said air-chamber; means for controlling the admission of atmospheric air to said air-chamber; means for controlling the passage of air from the air-chamber to the storage-tank; a heating-tank in operative connection with the air-chamber, combustion-chamber, and storage-tank; valve mechanism for controlling the passage of the products of combustion from said combustion-chamber to said heating-tank; valve mechanism for controlling the passage of heated air from said heating-tank to the air-chamber; means for controlling the passage of air from the storage-tank to the heating-tank; and cam mechanism for controlling the operation of said valve mechanism.

36. In a gas-engine, the combination of a pair of cylinders; pistons working therein and having rods connected with crank mechanism; an air-chamber communicating with one end of one cylinder and with the opposite end of the other cylinder; a combustion-chamber communicating with one end of one cylinder and with the opposite end of the other cylinder, the organization being such that the air and combustible material are effective at opposite sides of the same piston; means for supplying explosive material to said combustion-chamber; valve mechanism for controlling such supply; valve mechanism effective at one period for controlling the admission of atmospheric air to said air-chamber and effective at another period to control the exhaust of heated air therefrom; an air-storage tank in communication with said air-chamber; valve mechanism for controlling the passage of air from the air-chamber to the storage-tank; a heating-tank in operative connection with the air-chamber, combustion-chamber, and storage-tank; valve mechanism for controlling the passage of the products of combustion from said combustion-chamber to said heating-tank; valve mechanism for controlling the passage of heated air from said heating-tank to said air-chamber; valve mechanism for controlling the passage of air from the storage-tank to the heating-tank; and cam mechanism in operative connection with the pistons and actuated thereby for controlling some of said valve mechanisms.

37. The combination of a pair of cylinders; pistons working therein and having rods connected with crank mechanism; an air-chamber communicating with one of said cylinders adjacent to one end thereof and with the other of said cylinders adjacent to the opposite end thereof; a combustion-chamber also communicating with one of said cylinders adjacent to one end thereof and with the other of said cylinders adjacent to the opposite end thereof, the organization being such that the air and combustible material are effective at opposite sides of the same piston; means for supplying explosive material to said combustion-chamber; a valve for controlling the admission thereof; means for supplying air under pressure to said air-chamber; a valve for controlling the admission thereof; a valve operative by the suction of the pistons to control the admission of atmospheric air to said air-chamber at one period and mechanically operative at another period to control the exhaust of the air under pressure; a valve for controlling the exhaust of the products of combustion from said combustion-chamber; a cam-shaft in operative connection with the pistons; a cam secured thereto and in operative connection with said combustion-exhaust valve; a cam mounted on said cam-shaft and in operative connection with said atmospheric-air valve to permit an exhaust of air under pressure; a two-part cam mounted on said cam-shaft and in operative connection with the air-under-pressure admission-valve; and means for operating said two-part cam to permit the passage of air into said air-chamber once or a plurality of times during each cycle of operation of the pistons.

38. The combination of a pair of cylinders; pistons working therein and having rods connected with crank mechanism; an air-chamber communicating with one of said cylinders adjacent to one end thereof and with the other of said cylinders adjacent to the opposite end thereof; a combustion-chamber also communicating with one of said cylinders adjacent to one end thereof and with the other of said cylinders adjacent to the opposite end thereof, the organization being such that the air and combustible material are effective at opposite sides of the same piston; a carbureter for supplying explosive material to said combustion-chamber; a spring-controlled valve for controlling the admission of such explosive material and operated at one period by the suction of the pistons; means for supplying heated air under pressure to said air-chamber; a valve for controlling the admission thereof; a valve for controlling the admission of atmospheric air to said air-chamber and operative by the suction of the pistons at one period, and also mechanically operative at another period to control the exhaust of the air under pressure; a valve for controlling the exhaust of the products of combustion from said combustion-chamber; a cam-shaft in operative connection with the pistons; a cam secured thereto and in operative connection with said combustion-exhaust valve; a cam mounted on said cam-shaft and in operative connection with said atmospheric-air valve to permit an exhaust of the air under pressure; a two-part cam mounted on said cam-shaft and in operative connection with the air-under-pressure admission-valve; means for operating said two-part cam to permit the passage of air into said air-chamber once or a plurality of times during each cycle of operation of the pistons; and means for reversing the operation of said cams.

39. The combination of a pair of cylinders; pistons working therein and having rods connected with crank mechanism; an air-chamber in communication with one end of one cylinder and with the opposite end of the other cylinder; a combustion-chamber also in communication with one end of one cylinder and the opposite end of the other cylinder, the organization being such that the air and combustible material are effective at opposite sides of the same piston; means for supplying combustible material to said combustion-chamber; means for supplying air under pressure to said air-chamber; and means for controlling the admission of such air and including means operative to permit the admission of air once or a plurality of times during each cycle of operation of the pistons.

40. The combination of a pair of cylinders; pistons working therein and having rods connected with crank mechanism; an air-chamber in communication with one end of one cylinder and with the opposite end of the other cylinder; a combustion-chamber also in communication with one end of one cylinder and the opposite end of the other cylinder, the organization being such that the air and combustible material are effective at opposite sides of the same piston; means for supplying combustible material to said combustion-chamber; means for supplying air under pressure to said air-chamber; a valve for controlling the admission of such air; and cam mechanism in operative connection with said valve to control the working thereof and effective to have said valve admit air once or a plurality of times during each cycle of operation of the pistons; and means for actuating said cam mechanism.

41. The combination of a pair of cylinders; pistons working therein and having rods connected with crank mechanism; an air-chamber in communication with one end of one cylinder and with the opposite end of the other cylinder; a combustion-chamber also in communication with one end of one cylinder and the opposite end of the other cylinder, the organization being such that the air and combustible material are effective at opposite sides of the same piston; means for supplying combustible material to said combustion-chamber; means for supplying air under pressure to said air-chamber; a valve for controlling the admission of such air; a rotary cam-shaft in operative connection with the pistons; cam mechanism carried by and in operative connection with the valve; and means for shifting the cam mechanism thereby to have air admitted to said air-chamber once or a plurality of times during each cycle of operation of the pistons.

42. The combination of a pair of cylinders; pistons working therein and having rods connected with crank mechanism; an air-chamber in communication with one end of one cylinder and with the opposite end of the other cylinder; a combustion-chamber also in communication with one end of one cylinder and the opposite end of the other cylinder, the organization being such that the air and combustible material are effective at opposite sides of the same piston; means for supplying combustible material to said combustion-chamber; means for supplying air under pressure to said air-chamber; a valve for controlling the admission of such air; a rotary cam-shaft; a two-part cam in operative connection with said valve, one member thereof fixed to said shaft and the other member rotatable independently thereof, said cam members having a plurality of raised surfaces and a plurality of depressed surfaces and assembled relatively to each other to form a continuous raised surface with a depressed surface or a plurality of raised surfaces combined with a plurality of depressed surfaces; and means for shifting said shiftable cam member to effect the operation of said valve once or a plurality of times during each cycle of operation, thereby to admit air under pressure once or a plurality of times to the air-chamber.

43. A gas-engine comprising a pair of cylinders; a piston in each of said cylinders and having a rod connected with crank mechanism; an air-chamber communicating with both of said cylinders to permit air under pressure to be exerted at one side of one piston and at the opposite side of the other piston simultaneously; a combustion-chamber communicating with both of said cylinders to permit the pressure of exploded material to be exerted at one side of one piston and at the opposite side of the other piston simultaneously, the organization being such that the air and combustible material are effective at opposite sides of the same piston; means for controlling the admission of air under pressure to said air-chamber once or a plurality of times during each cycle of the pistons; means for controlling the admission of combustible material to the combustion-chamber; means for igniting said combustible material in the combustion-chamber; and means for controlling the exhaust from said combustion-chamber and air-chamber.

44. In a gas-engine, the combination of a pair of cylinders; pistons working therein and having rods connected with crank mechanism; an air-chamber in communication with said cylinders; a combustion-chamber also in communication with said cylinders; means for supplying air under pressure to said air-chamber; means for supplying combustible material to said combustion-chamber; valve mechanism for controlling the admission of air and combustible material, respectively; a cam-shaft in operative connection with the pistons and comprising a pair of members; cam mechanism carried thereon and in operative connection with the valve mechanism; and means for reversing the engine and comprising a shiftable sleeve splined to one member of said cam-shaft and provided with a curved groove receiving a projection carried by the other member of said cam-shaft, whereby on the reciprocation of said sleeve that member of the shaft carrying the cam mechanism is rotated in a direction reverse to its normal running movement to reverse the engine.

45. In a gas engine, the combination, of cylinder piston mechanism connected with crank mechanism; air mechanism embodying an air chamber and a storage tank in communication with each other and with said piston mechanism; and a heating device in communication with said storage tank and piston mechanism, and all organized and operative by means of valve mechanism so that said piston mechanism will at one period draw in atmospheric air and at another period compress such air into said storage tank, from whence it passes into the heating device after which the compressed air heated is supplied to the piston mechanism to operate the same, and is subsequently exhausted by such piston mechanism.

46. In a gas engine, the combination, of cylinder piston mechanism connected with crank mechanism; air mechanism embodying an air chamber and a storage tank in communication with each other and with said piston mechanism; and combustion mechanism embodying a combustion chamber and a combustible supply device in communication with each other and with said piston mechanism, and all organized and operative by means of valve mechanism so that the piston mechanism will be operated by air at one period, and at another period by the action of exploded material.

47. In a gas engine, the combination of cylinder piston mechanism connected with crank mechanism; combustion mechanism embodying a combustion chamber and a combustible supply device in communication with each other and with said piston mechanism; air mechanism embodying an air chamber and an air storage tank in communication with each other and with said piston mechanism; and a heating device in communication with said air storage tank and piston mechanism, and all organized and operative so that said piston mechanism will draw in atmospheric air and compress such air into the storage tank, and will draw in combustible material, and compress such material to permit the explosion thereof to operate said piston mechanism, said piston mechanism subsequently exhausting the spent products of combustion into said heating device to heat such compressed air supplied from the storage tank, and from which heating device the compressed air heated is supplied to the piston mechanism to operate the same at another period.

48. In a gas engine, the combination, of cylinder piston mechanism connected with crank mechanism; combustion mechanism embodying a combustion chamber and a combustible supply device in communication with each other and with said piston mechanism; air mechanism embodying an air chamber and an air storage tank in communication with each other and with said piston mechanism; a heating device in communication with said air storage tank and piston mechanism; and cam mechanism, all organized and operative so that at one period the piston mechanism will draw in atmospheric air, compress such air into said storage tank, and at another period draw in combustible material, compress such material to permit an explosion thereof whereby said piston mechanism will be operated at one period, such piston mechanism subsequently exhausting the spent products of combustion into said heating device to heat compressed air supplied from the air storage tank, and from which heating device compressed air heated is supplied once or a plurality of times during each cycle of operation to operate said piston mechanism.

49. A gas-engine comprising a plurality of pistons having rods connected with crank mechanism; an air-chamber; a combustion-chamber; an air-storage tank; a heating-tank; and a combustible-supply device organized and operative so that at one period said pistons will draw in combustible material from said supply device, force out the spent products of combustion into said heating-tank, and at another period draw in atmospheric air and compress the same into said storage-tank from whence it passes into said heating-tank, where it is heated, and from whence it passes to the pistons to operate the same, from whence it is exhausted.

50. A gas-engine comprising a plurality of pistons having rods connected with crank mechanism; an air-chamber; a combustion-chamber; an air-storage tank; a heating-tank; and a combustible-supply device organized and operative so that at one period said pistons will draw in combustible material from said supply device and force out the spent products of combustion into said heating-tank and at another period draw in atmospheric air and compress the same into said storage-tank, from whence it passes into said heating-tank, wherein it is heated, and from whence it passes to the pistons to operate the same, from whence it is exhausted into the open air during the ordinary running cycle and into the storage-tank during one period of the starting cycle.

51. The combination of a pair of cylinders; a piston in each of said cylinders and having a rod connected with crank mechanism; an air-chamber communicating adjacent to one end with one end of one of said cylinders and having but a single communication therewith, and adjacent to the opposite end with the other end of the other of said cylinders and likewise having but a single communication therewith, so that the pressure of air admitted thereto may be exerted at one side of one piston and at the opposite side of the other piston.

52. The combination of a pair of cylinders; a piston in each of said cylinders and having a rod connected with crank mechanism; a fluid-chamber having communication adjacent to one end with one of said cylinders and having but a single communication therewith, and adjacent to the opposite end with the other of said cylinders and likewise having but a single communication therewith.

53. The combination of a pair of cylinders; a piston in each of said cylinders and having a rod connected with crank mechanism; an air-chamber having communication adjacent to one end with one of said cylinders and having but a single communication therewith, and adjacent to the opposite end with the other of said cylinders and likewise having a single communication therewith and means for controlling the admission of air thereto.

54. The combination of a pair of cylinders; a piston in each of said cylinders and having rods connected with crank mechanism; a fluid-chamber communicating with one end of each of said cylinders; and a combustion-chamber communicating with both of said cylinders to permit the pressure of exploded material to be effective at one side of one piston and at the opposite side of the other piston.

55. The combination of a pair of cylinders; a piston in each of said cylinders and having rods connected with crank mechanism; a fluid-chamber communicating with one end of each of said cylinders to permit fluid under pressure to be effective at one side of one piston and at the opposite side of the other piston; and a combustion-chamber communicating with opposite ends respectively of each of said cylinders.

56. The combination of a pair of cylinders; pistons working therein and having piston-rods connected with crank mechanism; an air-chamber in communication with each of said cylinders; a combustion-chamber in communication with the other ends of both of said cylinders; and means effective to apply the heat resulting from the spent products of combustion to the air to heat the same before its supply to said pistons.

57. The combination of a pair of cylinders; pistons working therein and having rods connected with crank mechanism; an air-chamber in communication with one end of each of said cylinders; a combustion-chamber in communication with the other ends of said cylinders; and means effective to apply the heat resulting from the spent products of combustion to the air to heat the same before its supply to said pistons.

58. The combination of a pair of cylinders; a piston in each of said cylinders and having a rod connected with crank mechanism; a fluid-chamber having communication with one end of each of said cylinders so that the pressure of the fluid may be exerted successively at one side of one piston and at the opposite side of the other piston.

59. The combination of a pair of cylinders; a piston in each of said cylinders and having rods connected with crank mechanism; an air-chamber having a single communication with each of said cylinders so that the pressure of the air may be exerted successively at one side of one piston, and at the opposite side of the other piston; and means effective to apply heat to the air to heat the same before its passage into said cylinders.

60. The combination of a pair of cylinders; a piston working in each of said cylinders and connected with crank mechanism; and means for supplying a non-combustible fluid under pressure to one side of one piston and to the opposite side of the other piston simultaneously.

61. The combination of a pair of cylinders; a piston working in each of said cylinders and connected with crank mechanism; means for supplying compressed air to one side of one piston and to the opposite side of the other piston simultaneously; and means effective to heat the air prior to its supply to said pistons.

62. The combination of a plurality of cylinders; a piston in each of said cylinders and having a rod connected with crank mechanism; a plurality of fluid-chambers, each fluid-chamber communicating with one end of one cylinder and with the opposite end of another cylinder; and a plurality of combustion-chambers communicating with the opposite ends respectively of said cylinders.

63. The combination of a pair of cylinders; pistons working therein and connected with crank mechanism; an air chamber having communication with one end of one of said cylinders and with the opposite end of the other of said cylinders; an air storage tank; means for controlling the admission of air under pressure to the air chamber; and means in communication with said air chamber and storage tank to effect the heating of the air prior to its passage into said air chamber.

64. The combination of a pair of cylinders; pistons working therein and having rods connected with crank mechanism; an air-chamber having communication at opposite ends with each of said cylinders; an air-storage receptacle in communication with said chamber; means for controlling the admission of atmospheric air to said air-chamber, from whence it is compressed by said pistons into the storage-receptacle; and means in communication with said air-chamber and storage-receptacle to effect the heating of the air after its passage from said storage-receptacle and prior to its passage into said air-chamber.

65. The combination of a plurality of cylinders; a piston in each of said cylinders and having a rod connected with crank mechanism; a plurality of fluid-chambers communicating with one end of each of said cylinders; a plurality of combustion-chambers, each combustion-chamber communicating with one end of one cylinder and with the opposite end of another cylinder.

66. The combination of a pair of cylinders; a piston working in each thereof and having a rod connected with crank mechanism; an air-chamber in communication with one end of one cylinder and the opposite end of the other cylinder; means for supplying air under pressure to said air-chamber; and means for controlling the admission of such air and including means operative to permit the admission of air once or a plurality of times during each cycle of operation of the pistons.

67. The combination of a pair of cylinders; a piston working in each thereof and having a piston rod connected with crank mechanism; means for controlling the admission of air under pressure to one side of one piston and the opposite side of the other piston; and means for effecting the operation of said controlling means and including cam mechanism constructed and organized to permit on one adjustment thereof the admission of air once during each cycle of operation of the pistons, and on another adjustment thereof the admission of air a plurality of times during such cycle.

68. The combination of a cylinder; a piston working therein and having a rod connected with crank mechanism; means for supplying air under pressure to said cylinder; a valve for controlling the admission of such air to said cylinder; cam mechanism for controlling said valve; and means for controlling the operation of said cam mechanism whereby the valve is effective once or a plurality of times during each cycle of operation of the piston to alternately permit and prevent the passage of air to said cylinder.

69. The combination of a pair of cylinders; a piston working in each thereof and having a piston rod connected with crank mechanism; an air-chamber communicating with one end of one cylinder and with the opposite end of the other cylinder; means for supplying air under pressure to said chamber; a valve for controlling the admission of air to such chamber; a rotary cam-shaft in operative connection with the pistons; cam mechanism carried thereby and in operative connection with the valve, whereby said valve is controlled by the pistons at a predetermined period to permit the admission of air to the air-chamber; and means for shifting the cam mechanism thereby to alternately permit and prevent the admission of air to said air-chamber once or a plurality of times during each cycle of operation of the pistons.

70. The combination, with a piston-cylinder, a piston a means for moving the two cam-members together working therein and having a rod connected with crank mechanism, of means for supplying a fluid to said cylinder; means for controlling such supply and including cam mechanism comprising two cam members movable together, and one shiftable independently of the other, and constructed to permit the passage of such fluid once or a plurality of times to said cylinder during each cycle of operation of the piston; and means for shifting said shiftable cam member.

71. The combination of a pair of cylinders; pistons working therein and having rods connected with crank mechanism; an air-chamber communicating with one cylinder adjacent to one end thereof and with the other cylinder adjacent to the opposite end thereof; means for supplying air under pressure to said chamber; a valve for controlling the admission of such air; a cam-shaft operatively connected with said pistons for movement thereby; a compound cam operatively connected with said valve and having one member thereof fixed to said shaft and the other member rotatable independently thereof; and means for shifting one of said cam members relatively to the other thereby to cause the valve to be operated once or a plurality of times during each cycle of operation of the pistons to admit air under pressure to said chamber.

72. The combination of a pair of cylinders; pistons working therein and having rods connected with crank mechanism; an air-chamber communicating with one cylinder adjacent to one end thereof and with the other cylinder adjacent to the opposite end thereof; means for supplying air under pressure to said chamber; a valve for controlling the admission of such air; a cam-shaft operatively connected with said pistons for movement thereby; a compound cam one member thereof fixedly secured to said shaft and the other member rotatable independently thereof; a rocking-lever intermediate said valve and compound cam; and means for shifting said rotatable cam member relatively to the fixed cam member and embodying a shiftable member effective to rotate said shiftable cam member, whereby said cam mechanism is effective to operate the valve to permit the passage of air once or a plurality of times to the air-chamber during each cycle of operation of the pistons.

73. The combination of a pair of cylinders; pistons working therein and having rods connected with crank mechanism; an air-chamber communicating with one cylinder adjacent to one end thereof and with the other cylinder adjacent to the opposite end thereof; means for supplying air under pressure to said air-chamber; a valve for controlling the admission thereof; a slotted cam-shaft in operative connection with the pistons; a two-part cam carried by said cam-shaft and in operative connection with the valve: one member of said cam fixedly secured to said shaft and the other member thereof mounted on said shaft for movement independently thereof and having a sleeve provided with a curved groove; a shiftable sleeve mounted on said cam-sleeve and provided with a member projecting into the slot of said cam-shaft and into said curved groove, whereby on the reciprocation of said shiftable sleeve said rotatable cam member is shifted relatively to the fixed cam member to permit the valve to be operated to admit air under pressure to the air-chamber once or a plurality of times during each cycle of operation of the pistons.

74. The combination of a cylinder; a piston working therein and having a rod connected with crank mechanism; an air-chamber in communication with said cylinder; means for supplying air under pressure to said chamber; a valve for controlling the admission of such air; a rotary cam-shaft; a two-part cam in operative connection with said valve, one member thereof fixed to said shaft and the other member rotatable independently thereof, and said cam members having a plurality of raised surfaces and a plurality of depressed surfaces and assembled relatively to each other to form a continuous raised surface with a depressed surface, or a plurality of raised surfaces combined with a plurality of depressed surfaces; and means for shifting said shiftable cam member to effect the operation of said valve once or a plurality of times during each cycle of operation thereby to permit the passage of air under pressure once or a plurality of times to the air-chamber.

75. The combination of a pair of cylinders; pistons working therein and having rods connected with crank mechanism; an air-chamber in communication with one end of one cylinder and with the opposite end of the other cylinder; means for supplying air under pressure to said chamber; a valve for controlling the admission of such air; a cam-shaft in operative connection with the pistons; a two-part cam carried thereby and in operative connection with the valve, one member thereof fixed to said cam-shaft and the other member thereof having a movement independently of said fixed member, and each of said cam members having a plurality of depressions and a plurality of raised surfaces so assembled relatively to each other that said cam members may be organized with a continuous raised surface having one depressed surface or a plurality of alternating depressed and raised surfaces; and means for shifting said shiftable cam member thereby to permit the admission of air under pressure to the air-chamber once or a plurality of times during each cycle of operation.

76. The combination, with a piston-cylinder, a piston working therein and having a rod connected with crank mechanism, of means for supplying a fluid to said cylinder; means for controlling such supply and including a cam-shaft and a two-part cam mounted thereon one member thereof fixed thereto and the other member shiftable relatively thereto, said cam members having a plurality of depressed surfaces and a plurality of raised surfaces and assembled relatively to each other to form a continuous raised surface with a depressed surface or a plurality of depressed surfaces alternating with a plurality of raised surfaces; and means for shifting said shiftable cam member relatively to the other cam member.

77. In an engine, the combination with a spring-operated valve, of cam mechanism for controlling the operation thereof and for controlling the cam-shaft; a two-part cam comprising a cam-shaft; a two-part cam mounted thereon, one member thereof fixed thereto and the other member shiftable relatively thereto, and each of said cam members having a plurality of depressed surfaces and a plurality of raised surfaces and assembled relatively to each other to form a continuous raised surface with a depressed surface or a plurality of depressed surfaces alternating with a plurality of raised surfaces; and means for shifting said shiftable cam member.

78. In an engine, the combination, with a valve, of cam mechanism for controlling the operation thereof and comprising a cam-shaft having a slot therein; a two-part cam mounted thereon one member fixed thereto and the other member shiftable relatively thereto and having a sleeve provided with a curved groove; a shiftable member mounted on said cam-sleeve and having a projection movable in said shaft-slot and in said groove, whereby on shifting said sleeve said shiftable cam is rotated relatively to the fixed cam, each of said cam members having a plurality of raised and depressed surfaces whereby they may be assembled to form one depressed surface or a plurality thereof.

79. The combination of a pair of cylinders; pistons working therein and having rods connected with crank mechanism; an air-chamber communicating adjacent to one end with one end of one cylinder and adjacent to the other end with the opposite end of the other cylinder; means for supplying air under pressure to said air-chamber; a valve for controlling the admission of such air; a valve for controlling the exhaust of such air from the air-chamber; and cam mechanism in operative connection with said valves for controlling the same to permit the passage of air under pressure and to permit the exhaust thereof at the proper predetermined period.

80. The combination of a cylinder a piston working therein and having a rod connected with crank mechanism; an air-chamber in communication therewith; means for supplying air under pressure to said air-chamber; a valve for controlling the admission of such air; a valve for controlling the exhaust of such air from the air chamber; a cam-shaft in operative connection with the piston; a cam mounted thereon and in operative connection with said exhaust-valve whereby at a predetermined period in the movement of the piston the exhaust-valve is operated to permit an exhaust of air from the air chamber; and cam mechanism also mounted on said shaft and in operative connection with the air-admission valve and operative to permit the admission of air once or a plurality of times during each cycle of operation of the piston; and means for operating said cam mechanism.

81. The combination of a cylinder; a piston working therein and having a rod connected with crank mechanism; an air-chamber in communication therewith; a valve operative by the suction created by said piston at one predetermined period to permit the passage of atmospheric air into said air-chamber; a cam-shaft in operative connection with said piston; a cam mounted thereon and in operative connection with said valve to operate the same to permit an exhaust of the air from the air chamber at another period in the cycle of said piston.

82. The combination of a pair of cylinders; pistons working therein and having a rod connected with crank mechanism; an air-chamber communicating with one of said cylinders adjacent to one end thereof and with the other of said cylinders adjacent to the opposite end thereof; a valve operative by the suction created by the pistons at one period to admit atmospheric air to said chamber; a cam-shaft in operative connection with said pistons; a cam mounted thereon and in operative connection with said valve to operate the same at another period to permit an exhaust from said chamber.

83. In a gas-engine, the combination of a cylinder; a piston working therein and having a rod connected with crank mechanism; means for supplying a fluid to said cylinder; a valve for controlling such supply; a two-part cam-shaft in operative connection with said piston; a cam carried thereby and in operative connection with said valve; a shiftable member splined to one member of said cam-shaft for rotation therewith and provided with a curved groove receiving a projection carried by the cam-carrying member of said shaft, whereby on the reciprocation of said shiftable member the engine is reversed.

84. The combination of two sets of cylinders; pistons working therein simultaneously and having rods connected with crank mechanism; a pair of air-chambers one in communication with one end of one cylinder and with the opposite end of the other cylinder of the same set; means for supplying air under pressure to said air-chambers; and means for controlling the admission thereof.

85. In a gas-engine, the combination of two sets of cylinders; pistons working therein simultaneously and having rods connected with crank mechanism; a pair of combustion-chambers one in communication with one end of one cylinder and with the opposite end of the other cylinder of the same set; means for supplying combustible material to said chambers; means for controlling the admission thereof; means for igniting such material therein; and means for controlling the exhaust of the spent products of combustion therefrom.

86. The combination of a plurality of cylinders; a piston in each of said cylinders and having a rod connected with crank mechanism; a plurality of air-chambers each air-chamber communicating with one end of one cylinder and with the opposite end of another cylinder; and a plurality of combustion-chambers each combustion-chamber communicating with the other end of the same cylinder.

87. The combination of four cylinders organized in sets working therein and having piston rods connected with crank mechanism; a pair of air-chambers one in communication with one end of one cylinder and with the opposite end of the other cylinder of the same set; a pair of combustion-chambers one in communication with the other ends of the cylinders of the same set; means for controlling the admission of air to said air-chambers; and means for controlling the admission of combustible material to said combustion-chambers.

88. The combination of two sets of piston-cylinders; pistons working therein and having rods connected with crank mechanism; a pair of air-chambers one in communication with each set of said cylinders adjacent to one end of one and the opposite end of the other; a pair of combustion-chambers one in communication with each set of said cylinders adjacent to one end of one and the opposite end of the other, the organization being such that the air and combustible material of each set of cylinders are effective at opposite sides of the same piston; means for supplying air under pressure to said air-chambers; means for controlling the admission of such air to said air-chambers; means for controlling the exhaust of such air from said air-chambers; means for supplying combustible material to said combustion-chambers; means for controlling such supply; and means for controlling the exhaust of the products of combustion from said combustion-chambers.

89. The combination of two sets of piston-cylinders; a pair of air-chambers one in communication with each set of cylinders adjacent to one end of one and the opposite end of the other; a pair of combustion-chambers one in communication with each set of said cylinders adjacent to one end of one and the opposite end of the other, the organization being such that the air and combustible material of each set of cylinders are effective at opposite sides of the same piston; means for supplying air under pressure to said air-chambers; means for controlling the admission of such air to said air-chambers; means for controlling the exhaust of such air from said air-chambers and for permitting at another period the admission of atmospheric air to said air-chambers; means for supplying combustible material to said combustion-chambers; means for controlling the admission thereof; and means for controlling the exhaust of the products of combustion from said combustion-chambers.

90. The combination of a plurality of sets of piston-cylinders and having a rod connected with crank mechanism; pistons working in each of said cylinders; a plurality of air-chambers one in communication with each set of said cylinders adjacent to one end of one and the opposite end of the other; a plurality of combustion-chambers one in communication with each set of said cylinders adjacent to one end of one and the opposite end of the other, the organization being such that the air and combustible material of each set of cylinders are effective at opposite sides of the same piston; means for supplying air under pressure to said air-chambers; means for controlling the admission of such air; means for controlling the exhaust of such air; means for supplying combustible material to the combustion-chambers; and means for controlling the exhaust of the spent products of combustion, each of said controlling means including cam mechanism in operative connection with the pistons.

91. In a gas-engine, the combination of a plurality of sets of piston-cylinders; a piston working in each of said cylinders and having a rod connected with crank mechanism; a plurality of air-chambers one in communication with each set of said cylinders adjacent to one end of one and the opposite end of the other; a plurality of combustion-chambers one in communication with each set of said cylinders adjacent to one end of one and the opposite end of the other, the organization being such that the air and combustible material of each set of cylinders are effective at opposite sides of the same piston; means for supplying air under pressure to said air-chambers; valves for controlling the admission thereof; valves for controlling the exhaust thereof at one period and effective at another period to control the admission of atmospheric air to said air-chambers; means for supplying explosive material to said combustion-chamber; valves for controlling the admission thereof; valves for controlling the exhaust of the spent products of combustion from the combustion-chambers; a pair of cam-shafts in operative connection with said pistons and each carrying a cam in operative connection with one air-exhaust valve, thereby to operate the same at one period; a cam in operative connection with one combustion-exhaust valve, thereby to operate the same at another period; a two-part cam mechanism mounted on said shaft and in operative connection with one air-under-pressure admission-valve and effective to permit the passage of air once or a plurality of times during each cycle of operation of the pistons; and means for operating said two-part cam mechanism.

92. In a gas-engine, the combination of four cylinders; a piston working in each of said cylinders and having a rod connected with crank mechanism; a pair of air-chambers in communication with each set of said cylinders so that air will be admitted at one side of one piston and at the opposite side of the other piston; a pair of combustion-chambers one in communication with each set of said cylinders so that combustible material will be admitted at one side of one piston and at the opposite side of the other piston, the organization being such that the air and combustible material of each set of cylinders are effective at opposite sides of the same piston; an air-storage tank in communication with said air-chambers; a heating-tank in communication with said storage-tank, air-chambers, and combustion-chambers; a carbureter in communication with said combustion-chambers for supplying combustible material thereto; and means for igniting the combustible material in said combustion-chambers.

93. In a gas-engine, the combination of four cylinders; a driving-shaft; pistons working in said cylinders and operatively connected with said driving-shaft; a pair of cam-shafts in gear with said driving-shaft; a pair of air-chambers one in communication with each pair of said cylinders; a pair of combustion-chambers one in communication with each pair of said cylinders; means for supplying combustible material to said combustion-chambers; valve mechanism for controlling the supply thereof; a heating-tank; valve mechanism for controlling the passage of the products of combustion from said combustion-chambers to said heating-tank; valve mechanism for controlling the passage of air under pressure from said heating-tank to said air-chambers; an air-storage tank in communication with said air-chambers; valve mechanism for controlling the admission of atmospheric air to said air-chambers; valve mechanism for controlling the passage of such air after compression to said storage-tank; cams carried by each cam-shaft and in operative connection with their respective heated-air valve, atmospheric-air valve, and exhaust-product valve, whereby at predetermined periods in the operation of the pistons atmospheric air will be admitted to the air-chambers, compressed, and forced therefrom into the air-storage tank, from whence it passes to the heating-tank where it is heated by the products of combustion from the combustion-chambers, from whence it passes into the air-chambers, and from whence it is exhausted.

94. In a gas-engine, the combination of four cylinders; a driving-shaft; pistons working in said cylinders and operatively connected with said driving-shaft; a pair of cam-shafts in gear with said driving-shaft; a pair of air-chambers one in communication with each pair of said cylinders; a pair of combustion-chambers one in communication with each pair of said cylinders; means for supplying combustible material to said combustion-chambers; valve mechanism for controlling the supply thereof; a heating-tank; valve mechanism for controlling the passage of the products of combustion from said combustion-chambers to said heating-tank; valve mechanism for controlling the passage of air under pressure from said heating-tank to said air-chambers; an air-storage tank in communication with said air-chambers; valve mechanism for controlling the admission of atmospheric air to said chambers; valve mechanism for controlling the passage of such air after compression to said storage-tank; cam mechanism carried by each cam-shaft and in operative connection with its respective heated-air valve, atmospheric-air valve, and exhaust-product valve, whereby at predetermined periods in the operation of the pistons atmospheric air will be admitted to the air-chambers, compressed, and forced therefrom into the air-storage tank, from whence it passes to the heating-tank where it is heated by the products of combustion from the combustion-chambers, from whence it passes into the air-chambers, from whence it is exhausted; and means for operating said cam mechanism thereby to admit the passage of air under pressure once or a plurality of times to the air-chambers during each cycle of operation of the pistons.

95. In a gas-engine, the combination of four cylinders; a driving-shaft; pistons working in said cylinders and operatively connected with said driving-shaft; a pair of cam-shafts in gear with said driving-shaft; a pair of air-chambers one in communication with each pair of said cylinders; a pair of combustion-chambers one in communication with each pair of said cylinders; means for supplying combustible material to said combustion-chambers; valve mechanism for controlling the supply thereof; a heating-tank; valve mechanism for controlling the passage of the products of combustion from said combustion-chambers to said heating-tank; valve mechanism for controlling the passage of air under pressure from said heating-tank to said air-chambers; an air-storage tank in communication with said air-chambers; valve mechanism for controlling the admission of atmospheric air to said chambers; valve mechanism for controlling the passage of such air after compression to said storage-tank; cams carried by each cam-shaft and in operative connection with their respective heated-air valve, atmospheric-air valve, and exhaust-product valve, whereby at predetermined periods in the operation of the pistons atmospheric air will be admitted to the air-chambers, compressed, and forced therefrom into the air-storage tank, from whence it passes to the heating-tank, where it is heated by the products of combustion from the combustion-chambers, from whence it passes into the air-chambers, from whence it is exhausted; and means for reversing the engine.

96. In a gas-engine, the combination of four piston-cylinders organized in sets; a driving-shaft; a piston in each of said cylinders in operative engagement with said driving-shaft and having its rod constructed for the passage of air to the piston-cylinder; a valve carried by each piston for controlling the passage of air; a pair of cam-shafts geared to said driving-shaft; a pair of air-chambers one in communication with each pair of cylinders; a pair of combustion-chambers one in communication with each pair of cylinders; a carbureter in communication with said combustion-chambers; an igniting device effective in each combustion-chamber; an air-storage tank in communication with said air-chambers; a heating-tank in communication with said air-storage tank; valve mechanism for controlling the passage of the products of combustion from said combustion-chamber to said heating-tank; valve mechanism for controlling the passage of air under pressure from said heating-tank to said air-chambers; valve mechanism for controlling the admission of atmospheric air to the air-chambers; valve mechanism for controlling the passage of air to the air-storage tank; cams carried by each cam-shaft and in operative connection with certain of said valve mechanisms for controlling the admission of air under pressure, the exhaust thereof, and the exhaust of the products of combustion; and valve mechanism for controlling the admission of combustible material to said combustion-chambers.

AUGUSTUS G. PACE.

Witnesses:
C. A. WEED,
JOHN O. SEIFERT.